(12) United States Patent
Ritter et al.

(10) Patent No.: US 8,446,705 B2
(45) Date of Patent: May 21, 2013

(54) ULTRA BROADBAND CAPACITOR

(75) Inventors: Andrew P. Ritter, Surfside Beach, SC (US); John L. Galvagni, Surfside Beach, SC (US); John Mruz, East Northport, NY (US); Robert Grossbach, Commack, NY (US); Marianne Berolini, Southport, NC (US)

(73) Assignee: AVX Corporation, Fountain Inn, SC (US)

(*) Notice: Subject to any disclaimer, the term of this patent is extended or adjusted under 35 U.S.C. 154(b) by 773 days.

(21) Appl. No.: 12/538,584

(22) Filed: Aug. 10, 2009

(65) Prior Publication Data

US 2010/0039749 A1 Feb. 18, 2010

Related U.S. Application Data

(60) Provisional application No. 61/089,673, filed on Aug. 18, 2008, provisional application No. 61/089,969, filed on Aug. 19, 2008, provisional application No. 61/099,770, filed on Sep. 24, 2008, provisional application No. 61/099,778, filed on Sep. 24, 2008.

(51) Int. Cl.
  *H01G 4/30* (2006.01)
  *H01G 4/06* (2006.01)
  *H01G 4/005* (2006.01)
  *H01G 4/228* (2006.01)

(52) U.S. Cl.
  USPC .............. 361/301.4; 361/321.1; 361/312.2; 361/321.3; 361/303; 361/306.3

(58) Field of Classification Search
  USPC .......... 361/301.4, 303, 321.1–321.3, 306.3
  See application file for complete search history.

(56) References Cited

U.S. PATENT DOCUMENTS

| | | | |
|---|---|---|---|
| 3,304,475 A | 2/1967 | Gowen | |
| 3,444,436 A | 5/1969 | Coda | |
| 4,831,494 A | 5/1989 | Arnold et al. | |
| 4,931,901 A | 6/1990 | Heron, Jr. | |
| 5,517,385 A | 5/1996 | Galvagni et al. | |
| 6,243,253 B1 | 6/2001 | DuPre et al. | |
| 6,292,351 B1 | 9/2001 | Ahiko et al. | |
| 6,380,619 B2 | 4/2002 | Ahiko et al. | |
| 6,385,034 B2 * | 5/2002 | Tanaka | 361/306.3 |
| 6,407,906 B1 | 6/2002 | Ahiko et al. | |
| 6,441,459 B1 | 8/2002 | Togashi et al. | |

(Continued)

FOREIGN PATENT DOCUMENTS

JP   2008085054 A * 4/2008

OTHER PUBLICATIONS

Office Action for UK Patent Application No. 0914284.5 issued Mar. 7, 2012.

(Continued)

*Primary Examiner* — Eric Thomas
*Assistant Examiner* — Arun Ramaswamy
(74) *Attorney, Agent, or Firm* — Dority & Manning, P.A.

(57) ABSTRACT

Disclosed are apparatus and methodology for inexpensive realization of one or more secondary capacitors within a monolithic body that already includes a first, larger capacitor to provide ultra wideband structures. Alternating layers of electrodes are provided with arm portions that embrace portions of adjacent electrode layers so as to create additional coupling effects within the capacitor structure thereby producing multiple additional equivalent capacitor structures within the device.

32 Claims, 12 Drawing Sheets

U.S. PATENT DOCUMENTS

| | | |
|---|---|---|
| 6,452,781 B1 | 9/2002 | Ahiko et al. |
| 6,483,692 B2 | 11/2002 | Figueroa et al. |
| 6,576,497 B2 | 6/2003 | Ahiko et al. |
| 6,587,327 B1 | 7/2003 | Devoe et al. |
| 6,588,094 B2 | 7/2003 | Furukawa et al. |
| 6,606,237 B1 | 8/2003 | Naito et al. |
| 6,657,848 B2 | 12/2003 | Togashi et al. |
| 6,661,640 B2 | 12/2003 | Togashi |
| 6,757,152 B2 | 6/2004 | Galvagni et al. |
| 6,765,781 B2 | 7/2004 | Togashi |
| 6,768,630 B2 | 7/2004 | Togashi |
| 6,781,816 B2 | 8/2004 | Togashi |
| 6,807,047 B2 | 10/2004 | Togashi et al. |
| 6,816,356 B2 | 11/2004 | Devoe et al. |
| 6,822,847 B2 | 11/2004 | Devoe et al. |
| 6,829,134 B2 * | 12/2004 | Yamauchi et al. ............ 361/303 |
| 6,885,544 B2 | 4/2005 | Kim et al. |
| 6,914,767 B2 | 7/2005 | Togashi et al. |
| 6,917,510 B1 | 7/2005 | Prymak |
| 6,922,329 B2 | 7/2005 | Togashi |
| 6,950,300 B2 | 9/2005 | Sutardja |
| 6,956,730 B2 | 10/2005 | Togashi |
| 6,958,899 B2 | 10/2005 | Togashi et al. |
| 6,965,507 B2 | 11/2005 | Togashi et al. |
| 6,970,342 B1 | 11/2005 | Togashi |
| 6,995,967 B2 | 2/2006 | Togashi et al. |
| 6,999,300 B2 | 2/2006 | Togashi et al. |
| 7,019,957 B2 | 3/2006 | Togashi et al. |
| 7,019,958 B2 | 3/2006 | Togashi et al. |
| 7,038,905 B2 | 5/2006 | Yoshihara et al. |
| 7,050,288 B2 | 5/2006 | Ahiko et al. |
| 7,050,289 B2 | 5/2006 | Togashi |
| 7,054,134 B2 | 5/2006 | Togashi et al. |
| 7,061,747 B2 | 6/2006 | Togashi et al. |
| 7,075,774 B2 | 7/2006 | Togashi et al. |
| 7,085,124 B2 | 8/2006 | Togashi |
| 7,088,569 B1 | 8/2006 | Togashi et al. |
| 7,099,138 B1 | 8/2006 | Togashi et al. |
| 7,145,429 B1 | 12/2006 | Togashi et al. |
| 7,152,291 B2 | 12/2006 | Ritter et al. |
| 7,154,374 B2 * | 12/2006 | Ritter et al. ............ 338/323 |
| 7,230,816 B2 | 6/2007 | Sutardja |
| 7,248,458 B2 | 7/2007 | Mruz |
| 7,283,348 B2 | 10/2007 | Togashi et al. |
| 7,298,604 B2 | 11/2007 | Togashi et al. |
| 7,364,598 B2 | 4/2008 | Mruz |
| 7,414,857 B2 | 8/2008 | Ritter et al. |
| 2002/0041006 A1 | 4/2002 | Ahiko et al. |
| 2003/0011963 A1 | 1/2003 | Ahiko et al. |
| 2003/0026059 A1 | 2/2003 | Togashi |
| 2004/0174656 A1 * | 9/2004 | MacNeal et al. ........... 361/306.3 |
| 2004/0184202 A1 | 9/2004 | Togashi et al. |
| 2005/0047059 A1 | 3/2005 | Togashi |
| 2005/0264977 A1 | 12/2005 | Tagashi |
| 2006/0028785 A1 | 2/2006 | Togashi et al. |
| 2006/0133057 A1 | 6/2006 | McGregor et al. |
| 2006/0152886 A1 | 7/2006 | Togashi et al. |
| 2006/0164789 A1 | 7/2006 | Togashi et al. |
| 2006/0176644 A1 | 8/2006 | Togashi et al. |
| 2006/0203422 A1 | 9/2006 | Togashi |
| 2006/0203425 A1 | 9/2006 | Togashi et al. |
| 2006/0203426 A1 | 9/2006 | Togashi et al. |
| 2006/0203427 A1 | 9/2006 | Togashi et al. |
| 2006/0209492 A1 | 9/2006 | Togashi |
| 2006/0214263 A1 | 9/2006 | Kojima et al. |
| 2006/0221545 A1 | 10/2006 | Togashi |
| 2006/0221546 A1 | 10/2006 | Togashi |
| 2008/0049377 A1 | 2/2008 | Sutardja |

OTHER PUBLICATIONS

Search Report for UK Patent Application No. GB0914284.5 dated Mar. 17, 2010.

* cited by examiner

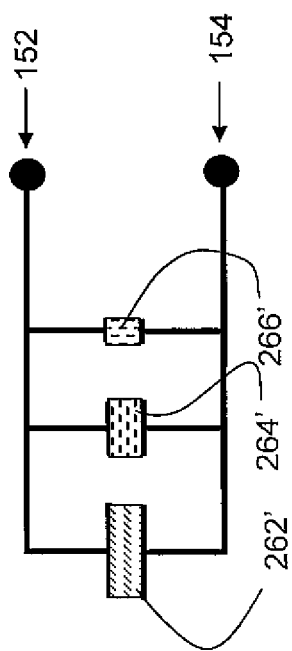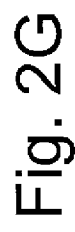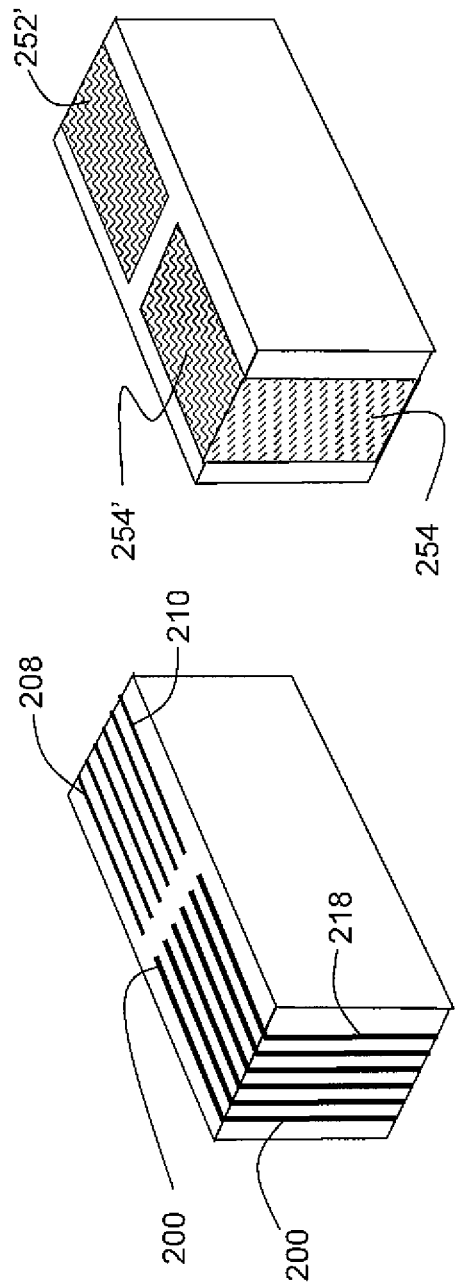

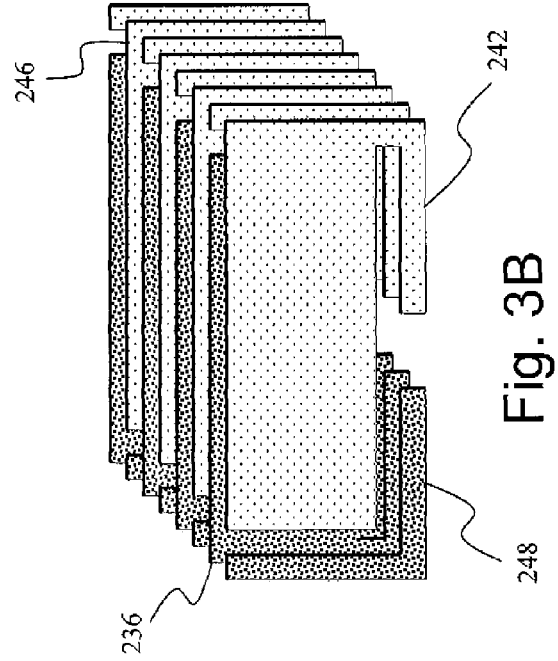
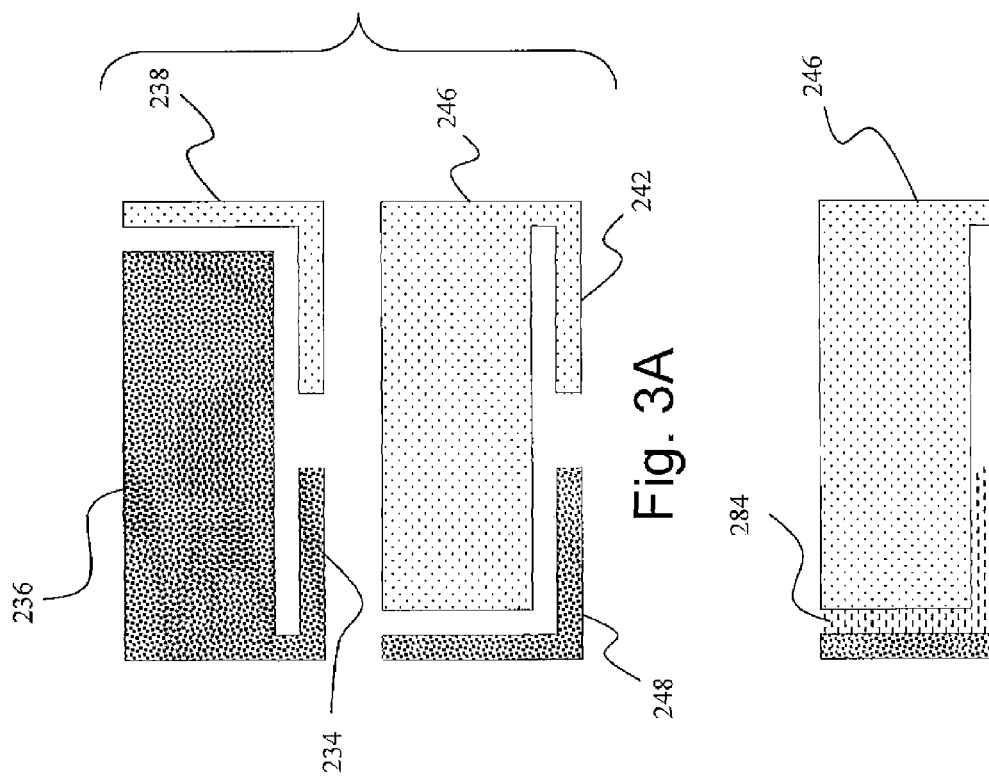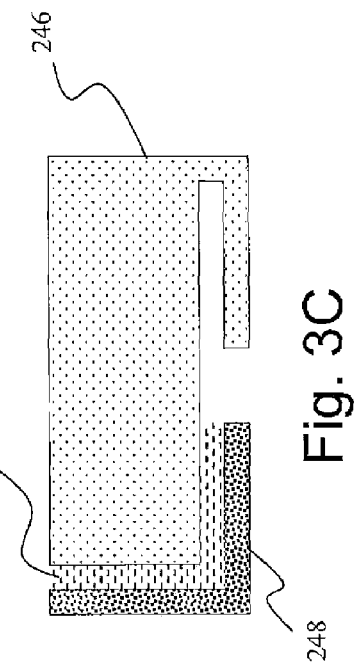

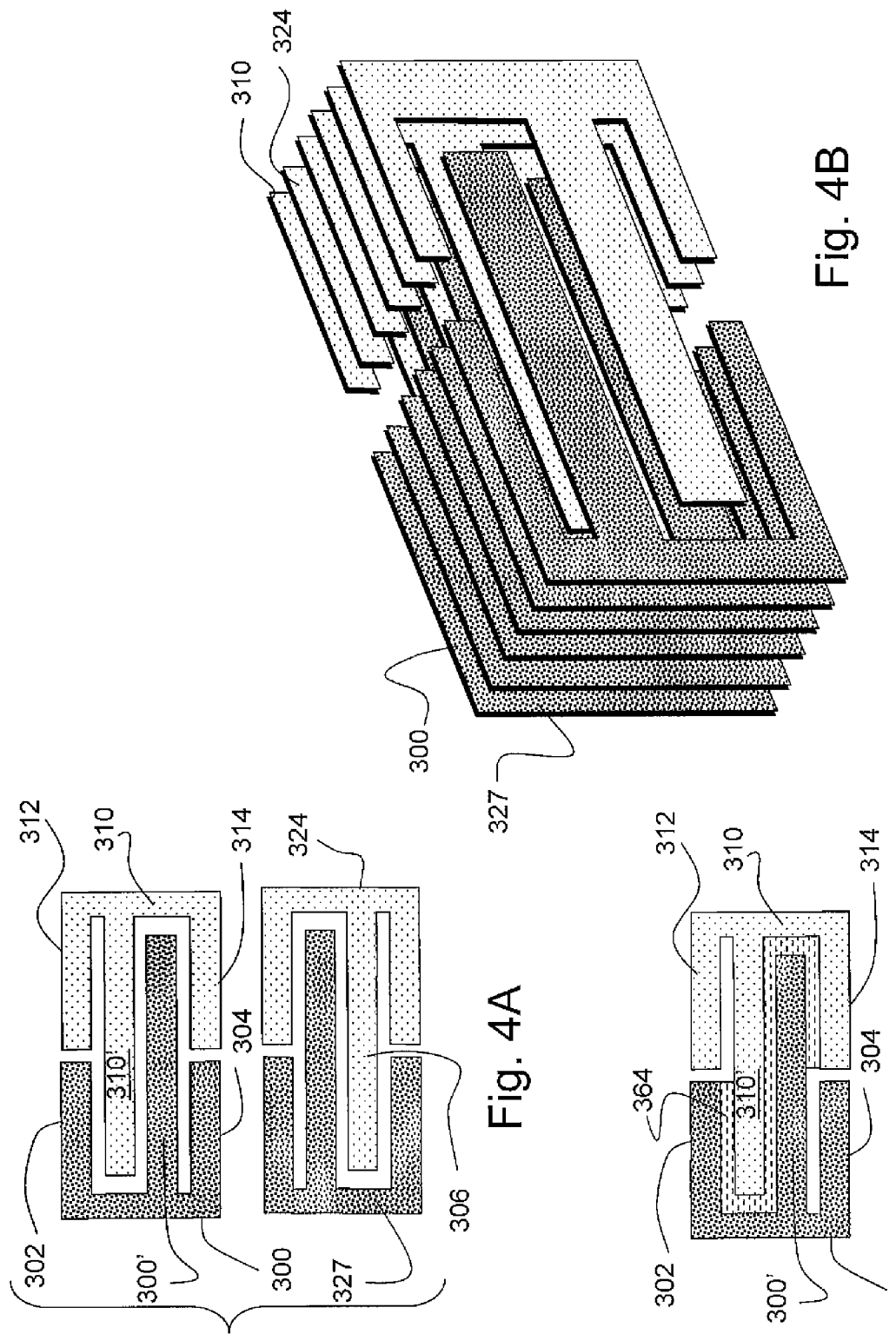

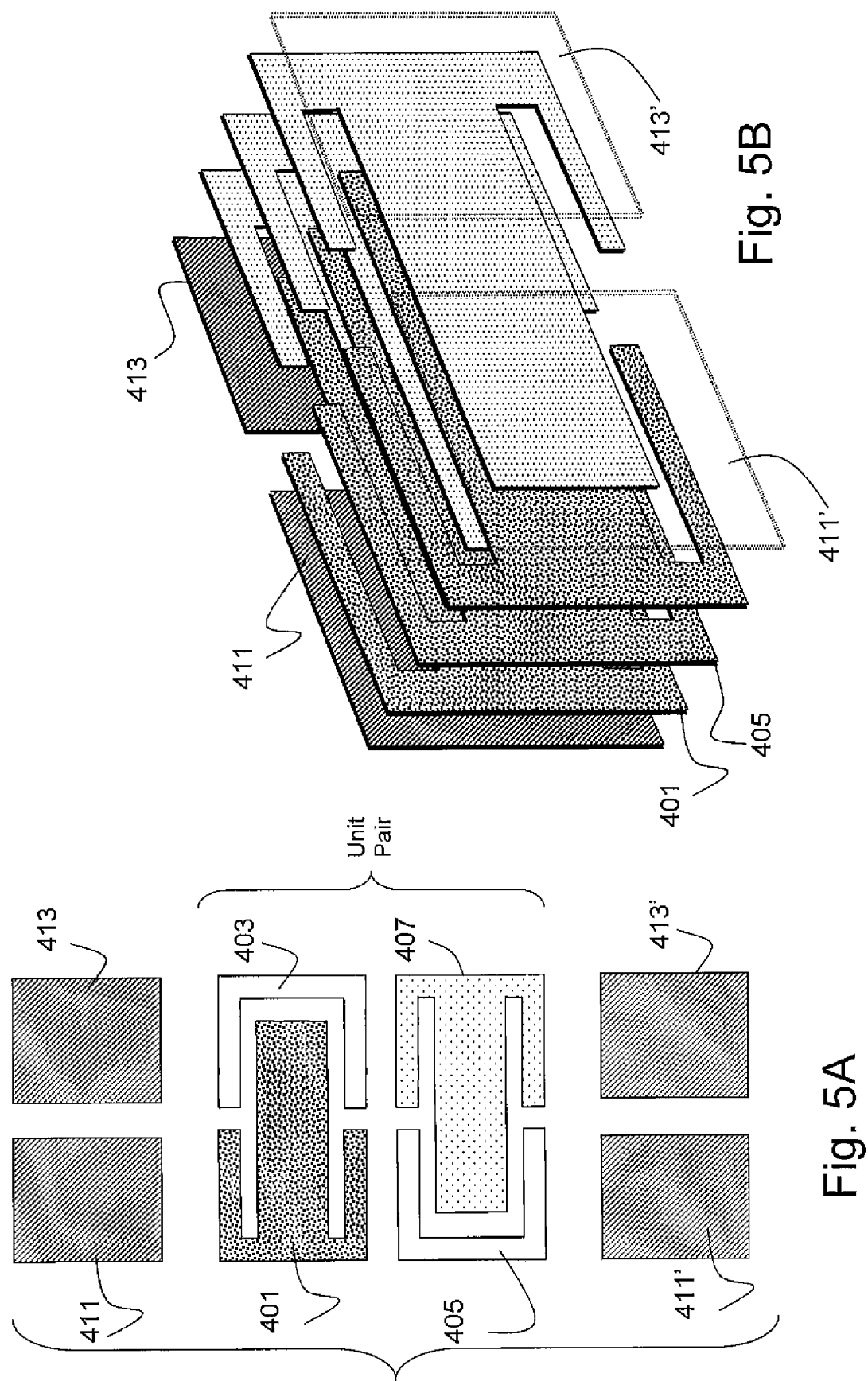

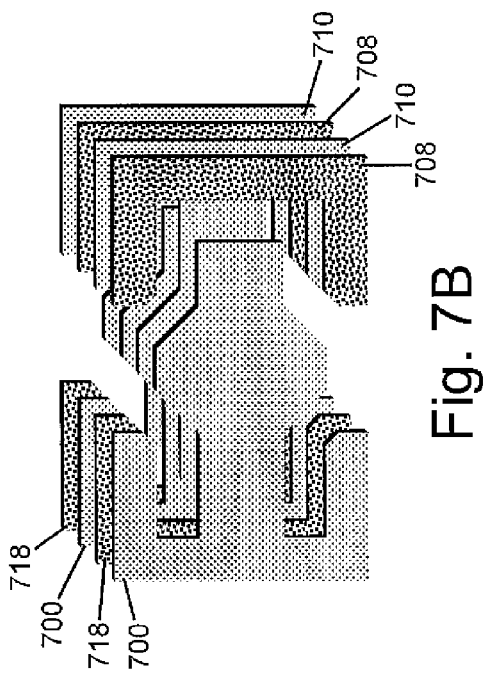
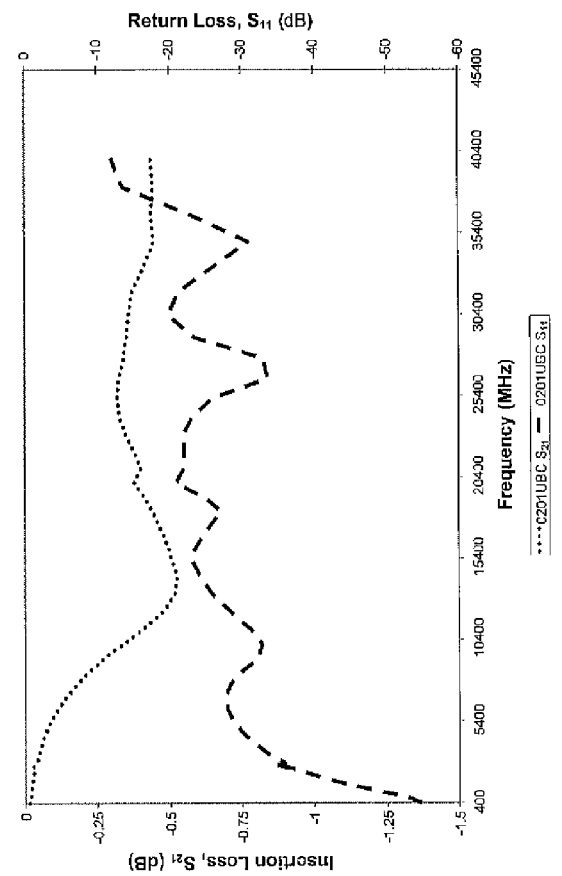
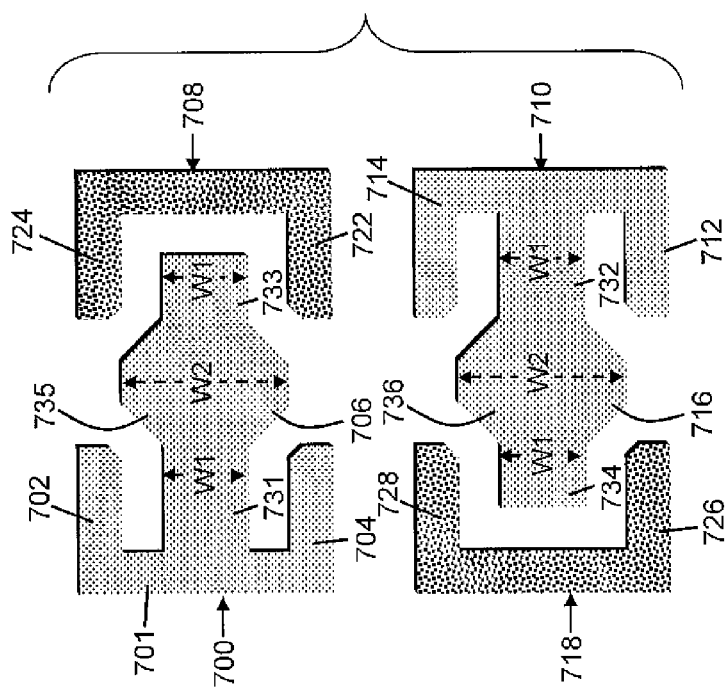
Fig. 7A
Fig. 7B
Fig. 7C ic # ULTRA BROADBAND CAPACITOR

PRIORITY CLAIM

This application claims the benefit of U.S. Provisional Application No. 61/089,673 filed Aug. 18, 2008, U.S. Provisional Application No. 61/089,969 filed Aug. 19, 2008, U.S. Provisional Application No. 61/099,770 filed Sep. 24, 2008, and U.S. Provisional Application No. 61/099,778, filed Sep. 24, 2008, all entitled "ULTRA BROADBAND CAPACITOR." All of the above applications are incorporated herein by reference for all purposes.

FIELD OF THE INVENTION

The present subject matter relates to ultra broadband capacitors, and more particularly, to simplified configurations to facilitate the formation of multiple capacitive regions within the internal electrode layers of a multilayer ceramic capacitor structure and to methods of making such capacitors.

BACKGROUND OF THE INVENTION

The diversity of modern technical applications creates a need for efficient electronic components and integrated circuits for use therein. Capacitors are a fundamental component used for filtering, coupling, bypassing and other aspects of such modern applications which may include wireless communications, alarm systems, radar systems, circuit switching, matching networks, and many other applications. A dramatic increase in the speed and packing density of integrated circuits requires advancements in coupling capacitor technology in particular. When high-capacitance coupling capacitors are subjected to the high frequencies of many present applications, performance characteristics become increasingly more important. Since capacitors are fundamental to such a wide variety of applications, their precision and efficiency is imperative. Many specific aspects of capacitor design have thus been a focus for improving the performance characteristics of capacitors.

The incredible variety of capacitor environments implies that capacitors are often subjected to a number of different operating frequencies. Many wireless communications systems, including satellite, GPS, and cellular applications, as well as high speed processor applications require capacitor technology that can accommodate high frequencies of operation. As such, wideband capacitors have been previously provided in several forms to accommodate incorporation into many different types of electronic equipment. In several of these previously known configurations, emphasis has been placed on providing plural capacitive elements within a single structure. Such plural elements have taken many forms including physically separate devices electrically coupled together and plural element device design to produce secondary components that function as additional capacitive elements within the single device.

U.S. Pat. No. 6,816,356 to Devoe et al. is one such device. Devoe et al. provide an integrated capacitor array including a plurality of capacitors connected in series and/or parallel circuits in a substantially monolithic dielectric body. The device includes both a multi-layer lower frequency, higher value capacitor and a higher frequency, lower value capacitor.

U.S. Pat. No. 7,248,458 to Mruz discloses another example of wideband capacitor construction providing both a low frequency portion and a high frequency portion. As illustrated herein in FIGS. 1A-1J, Mruz's wideband capacitor is constructed using a fairly complex and expensive production technique.

FIGS. 1A-1J depict construction of a wideband device in accordance with Mruz's teachings. As illustrated in FIG. 1A, device 100, is a standard multilayer capacitor (MLC) without termination. Capacitor 100 consists of alternating electrodes 102, 104 in a ceramic structure 110 that provides the dielectric separating electrodes 102, 104.

FIG. 1B illustrates a cross-section of capacitor 100 taken along line A-A of FIG. 1A. After formation of capacitor 100, an overall coating of conductive metal 120, usually electroless nickel followed by an electroless gold flash, is applied on all six sides of capacitor 100. Following coating with conductive metal 120, cut 130 through conductive metal 120 is provided by suitable means to isolate the two polarities of capacitor 100, represented in FIG. 1C as terminal portions 132, 134. FIG. 1D illustrates a cross-section of capacitor 100 similar to that illustrated in FIG. 1B showing the cut 130 into conductive metal coating 120 producing separated terminal portions 132, 134.

Next, as illustrated in FIG. 1E, an insulative coating 140 is applied over the now separated portions 132, 134 of conductive metal coating 120. Insulating layer 140 may generally correspond to an epoxy coating. It will be appreciated that, as illustrated in the capacitor cross-section of FIG. 1F, the insulating coating 140 will generally fill the gap created by cut 130. After the epoxy, or other insulating material, is cured, the part is either batch plated or dipped into termination paste at each end, forming solderable terminals 152, 154 as illustrated in FIG. 1G. The completed part is now shown in longitudinal cross-section in FIG. 1H.

Due to the configuration of the completed structure, additional capacitances are formed as shown in FIG. 1I at area 164 between top electrode 102a and the circumferential plating 134, as well as at area 165 between the bottom electrode 104a and the plating 132. These additional capacitances are represented as areas 164 and 165. Similarly there is a capacitance, albeit quite small, between the end of the electrodes and the end plating, which is represented as areas 166 and 167. The major capacitance comes from the overlap area inside the MLC, which is represented as area 162.

These various capacitances are represented schematically at low frequencies in FIG. 1J. The large overlap area 162 gives rise to the schematic capacitor 162'. The second areas 164 and 165 contribute to the capacitance 164', 165' and the small end capacitor areas 166 and 167 give rise to capacitor 166', 167'. Common cross hatching relates the areas to the capacitors. The resulting equivalent capacitive circuit of different value capacitors in parallel provides for a broad-band response.

While the prior art has provided various methodologies for constructing wideband capacitive components, it would, nevertheless be advantageous to provide similar or improved results at a significant reduction in production effort and cost.

While various implementations of wideband capacitors have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, an improved apparatus and methodology for providing wideband capacitors has been developed.

In an exemplary configuration, a wideband capacitor has been developed employing features that increase and reproducibly control the values of secondary and tertiary, small value, capacitors in parallel with the primary multilayer monolithic capacitor structures.

In one of its simpler forms, a wideband capacitor has been developed employing a plurality of stacked electrodes, each having a central portion and a single arm or pair of outside anus connected therewith to generate multiple capacitive elements. Advantages are achieved by creating plural capacitive elements within a single set of stacked electrodes. Such an approach is more efficient and less expensive than other approaches that require separate and distinct electrode sets, floating internal plates, external terminal features, internal vias or other additional components to create capacitive elements in addition to a primary parallel-plate capacitance.

Another positive aspect of this type of device is that a significantly reduced number of processing steps are required to provide capacitive devices that are fully compatible with and produce substantially similar characteristics as previously developed devices.

In accordance with aspects of certain embodiments of the present subject matter, methodologies are provided to further increase the number of secondary capacitive elements within a capacitor device by providing a mechanism to produce more opportunities for coupling of opposing polarity electrodes to be achieved within the capacitor body without requiring additional processing steps. In many embodiments, plural capacitive elements can be achieved by unique design and configuration of a single repeating set of opposing electrode sheets.

In accordance with certain aspects of other embodiments of the present subject matter, methodologies have been developed to simplify construction of a wideband capacitor by elimination of expensive and time-consuming process steps while maintaining functionally equivalent operational characteristics.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

In one exemplary embodiment of the subject technology, a multilayer capacitor includes a plurality of first electrode sheets, a plurality of second electrode sheets, dielectric material, a first external termination and a second external termination. Each first electrode sheet includes a first main electrode and a separate first counter electrode provided in substantially the same plane, wherein the first main electrode comprises a central portion and at least one extension arm positioned beside the central portion, and wherein the first counter electrode comprises at least one extension arm substantially longitudinally aligned with the at least one extension arm of the first main electrode. Each second electrode sheet includes a second main electrode and a separate second counter electrode provided in substantially the same plane, wherein the second main electrode comprises a central portion and at least one extension arm positioned beside the central portion, and wherein the second counter electrode comprises at least one extension arm longitudinally aligned with the at least one extension arm of the second main electrode. The dielectric material is interleaved between adjacently stacked first and second electrode sheets to form a stacked arrangement of unit cells, wherein at least part of the central portion of each first main electrode overlaps with at least part of the central portion of a second main electrode in each unit cell. The first external termination is electrically connected to each first main electrode and each second counter electrode, and the second external termination is electrically connected to each second main electrode and each first counter electrode.

In another exemplary embodiment of the subject technology, a broadband capacitor includes a plurality of first electrode sheets, a plurality of second electrode sheets and a plurality of dielectric layers. Each first electrode sheet includes a first main electrode and a separate first counter electrode provided in substantially the same plane. Each second electrode sheet includes a second main electrode and a separate second counter electrode provided in substantially the same plane. The plurality of dielectric layers is interleaved with alternating first and second electrode sheets to form a stacked configuration. A low frequency primary capacitance is formed from an overlap between each opposing pair of first and second main electrodes, and a high frequency secondary capacitance is formed from coupling between the main electrode and counter electrode in each first and second electrode sheet, In yet another exemplary embodiment of the subject technology, a multilayer capacitor includes a plurality of first electrode sheets, a plurality of second electrode sheets, dielectric material interleaved between adjacently stacked first and second electrode sheets to form a stacked arrangement of unit cells, a plurality of third electrode sheets, a plurality of fourth electrode sheets, additional dielectric material interleaved with selected sheets of the plurality of third and fourth electrode sheets to form first and second cover layers, a first external termination and a second external termination. Each first electrode sheet includes a first main electrode and a separate first counter electrode provided in substantially the same plane, wherein each first main electrode comprises an end portion, a central portion and first and second extension arms, wherein the central portion and first and second extension arms of the first main electrode all extend from different locations along the end portion of the first main electrode in a substantially parallel relationship, with the central portion between the first and second extension arms, and wherein each first counter electrode comprises an end portion and first and second extension arms extending from the end portion, with the first extension arm of the first counter electrode being substantially longitudinally aligned with the first extension arm of the first main electrode and the second extension arm of the first counter electrode being substantially longitudinally aligned with the second extension arm of the first main electrode. Each second electrode sheet includes a second main electrode and a separate second counter electrode provided in substantially the same plane, wherein each second main electrode comprises an end portion, a central portion and first and second extension arms, wherein the central portion and first and second extension arms of the second main electrode all extend from different locations along the end portion of the second main electrode in a substantially parallel relationship, with the central portion between the first and second extension arms, and wherein each second counter electrode comprises an end portion and first and second extension arms extending from the end portion, with the first extension arm of the second counter electrode being substantially longitudinally aligned with the first extension arm of the second main electrode and the second extension arm of the second counter electrode being substantially longitudinally aligned with the second extension arm of the second main electrode. At least part of the central portion of each first main electrode overlaps with at least part of the central portion of a second main electrode with interleaved dielectric material in each unit cell. Each third electrode sheet includes third and fourth opposing counter electrodes provided in substantially the same plane. Each fourth electrode sheet includes first and second opposing shield electrodes provided in substantially the same plane. A first cover layer is provided on top of the alternately stacked first and second electrode sheets and interleaved dielectric material, and a second cover layer provided on the bottom of the alternately stacked first and second electrode sheets and interleaved dielectric material. The first external termination is electrically connected to each first main electrode, each second counter electrode, each third counter electrode and each first shield electrode. The second external termination is electrically connected to each second main electrode, each first counter electrode, each fourth counter electrode and each second shield electrode.

In a still further exemplary embodiment of the subject technology, a method of providing a broadband capacitor includes providing a plurality of first electrode sheets, each comprising a first main electrode and a separate first counter electrode provided in substantially the same plane, providing a plurality of second electrode sheets, each comprising a second main electrode and a separate second counter electrode provided in substantially the same plane; and interleaving a plurality of dielectric layers with alternating first and second electrode sheets to form a stacked configuration, with an overlap formed between each opposing pair of first and second main electrodes, so that a low frequency primary capacitance is formed therefrom, and with a high frequency secondary capacitance formed from coupling between the main electrode and counter electrode in each first and second electrode sheet.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIGS. 2A-2G illustrate, respectively, construction aspects of a first exemplary embodiment of an ultra broadband capacitor in accordance with the present subject matter;

FIGS. 3A-3C illustrate, respectively, construction aspects of a first variation of the first exemplary ultra broadband capacitor embodiment of the present subject matter;

FIGS. 4A-4C illustrate, respectively, construction aspects of a second exemplary embodiment of an ultra broadband capacitor in accordance with the present subject matter;

FIGS. 5A-5B illustrate, respectively, construction aspects of a third exemplary embodiment of an ultra broadband capacitor in accordance with the present subject matter;

FIGS. 6A-6B illustrate performance characteristics of previously know wideband capacitor, while

FIGS. 7A-7B illustrate, respectively, construction aspects of a second variation of the first exemplary ultra broadband capacitor embodiment of the present subject matter;

FIG. 7C illustrates performance characteristics of an exemplary wideband capacitor as shown in FIGS. 7A-7B and constructed in accordance with the present technology;

Figure 1A:
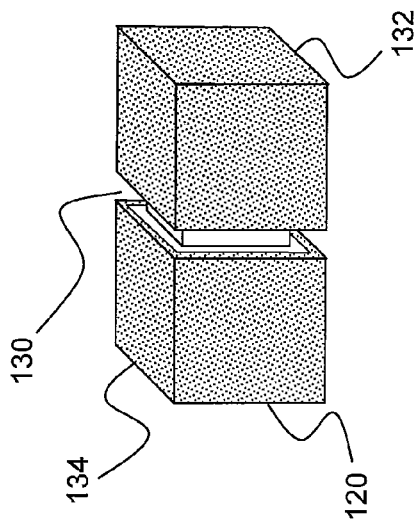
FIGS. 1A-1J illustrate, respectively, steps in the construction of a previously known wideband capacitor, namely that set forth in U.S. Pat. No. 7,248,458 (Mruz)
Figure 1B:
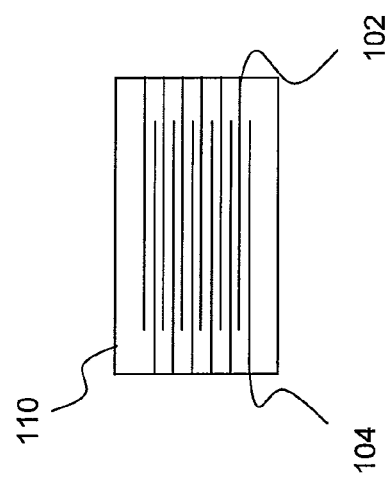
Figure 1C:
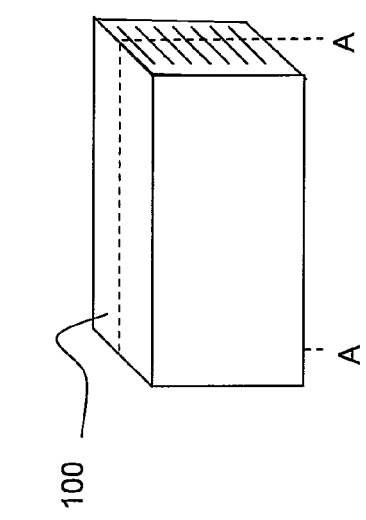
Figure 1D:
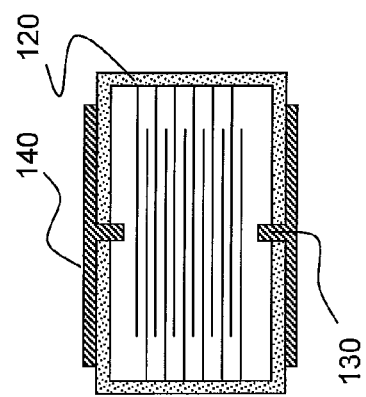
Figure 1E:
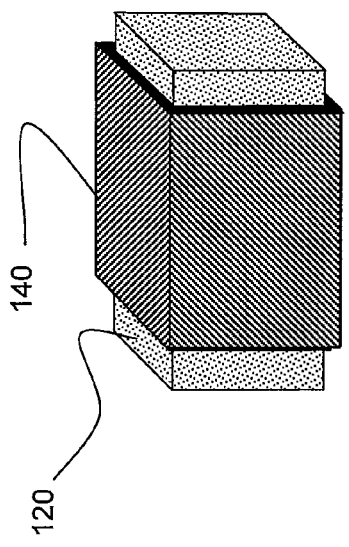
Figure 1F:
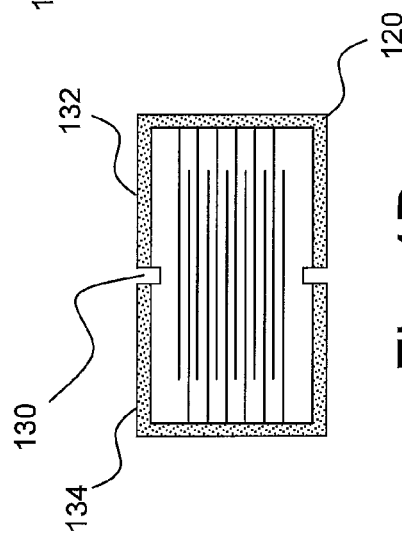
Figure 1H:
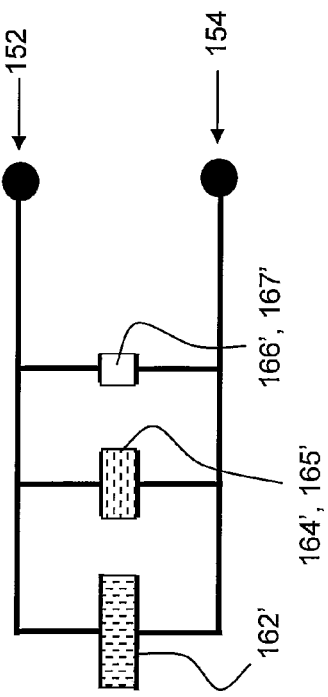
Figure 1J:
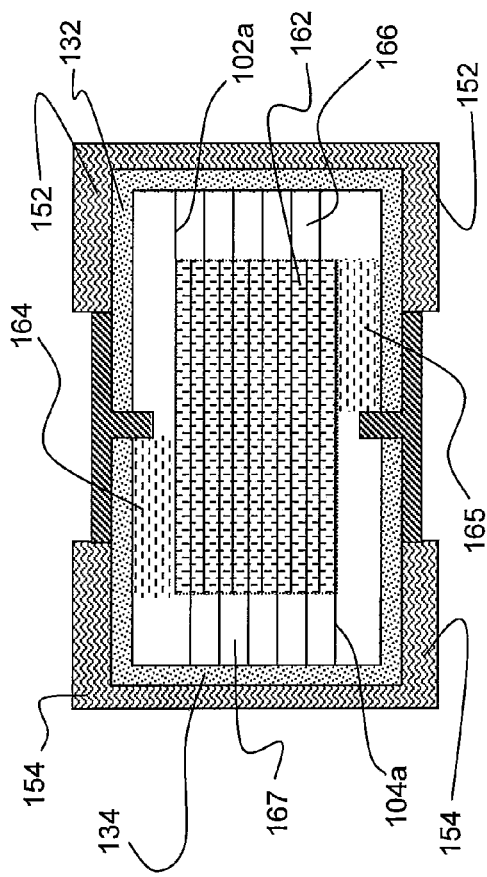
Figure 1G:
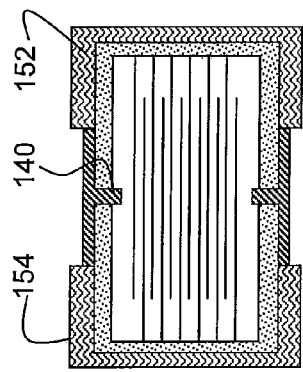
Figure 1I:
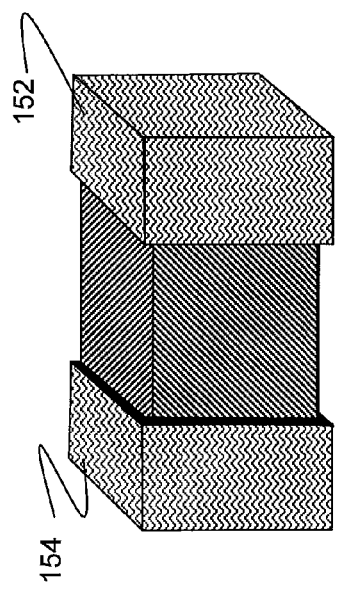

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Summary of the Invention section, the present subject matter is particularly concerned with improved apparatus and methodology for providing ultra broadband capacitors.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Figure 2A:
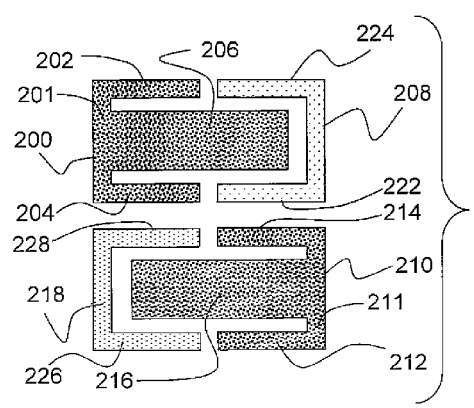

Reference will now be made in detail to the presently preferred embodiments of the subject ultra broadband capacitors. Referring now to the drawings, FIGS. 2A-2G illustrate the structure of a capacitor constructed in accordance with a first embodiment of the present subject matter that has provided therein significant amounts of reproducible secondary and tertiary capacitive elements. FIG. 2A illustrates a planar view of a unit cell, or pair of electrodes that are replicated many times in a stack of electrodes as may be employed to produce a broadband (i.e., wideband) capacitor in accordance with present technology. In an exemplary construction, over a hundred sets of electrode pairs may be provided in any one capacitor. Those of ordinary skill in the art, however, will appreciate that the exact number of cells provided depends on many variables including, for example, the target design value for the capacitor. The number of unit cells and corresponding electrodes illustrated in the drawings and discussed in the specification are used as an example only, and should not be considered an unnecessarily limiting aspect of the present technology.

In accordance with the first exemplary embodiment of the present subject matter, a first pattern set of electrodes corresponds to a first main electrode 200, with arm-like appendages (i.e., extension arms) 202, 204 positioned on either side of a central portion 206. On the same plane, serving as both anchor tab and counter electrode is a first C-shaped electrode 208 having side arms 222, 224. In one embodiment, first main electrode 200 can be viewed as having an end portion 201 that extends to and is exposed along an entire dimension of a surface of an unterminated slack of dielectric and electrode layers. The central portion 206 and extension arms 202, 204 of first main electrode 200 all extend from different locations along the end portion 201 in a manner such that central portion 206 and extension arms 202, 204 are all generally parallel to one another. Respective sides of the extension arms 202 and 204 may also extend to and be exposed along respective surfaces adjacent to the surface at which end portion 201 is exposed. First C-shaped electrode 208 also has an end portion that extends to and is exposed along an entire surface of an unterminated stack of dielectric and electrode layers. The side arms 222, 224 extend from such end portion of first C-shaped electrode 208 and have portions that extend to and are exposed along respective surfaces adjacent to the surface at which the end portion of first C-shaped electrode 208 is exposed.

The second pattern set of electrodes has a similar, mirrored, structure, where second main electrode 210 includes extension arms 212, 214 positioned on either side of central portion 216. Central portion 216 and extension arms 212, 214 all generally extend parallel to one another from an end portion 211. On the same plane, serving as both anchor tab and counter electrode is a second C-shaped electrode 218 having side arms 226, 228. As described above relative to first main electrode 200 and first C-shaped electrode 208, the second main electrode 210 and second C-shaped electrode 218 may be viewed as having end portions from which central portions and/or side arm portions extend. Other aspects of positioning and exposure along a device periphery may equally apply, although it should be appreciated that some embodiments may not require the full amount of surface exposure of the various electrode edges as illustrated and described above with respect to FIG. 2A.

Figure 2B:
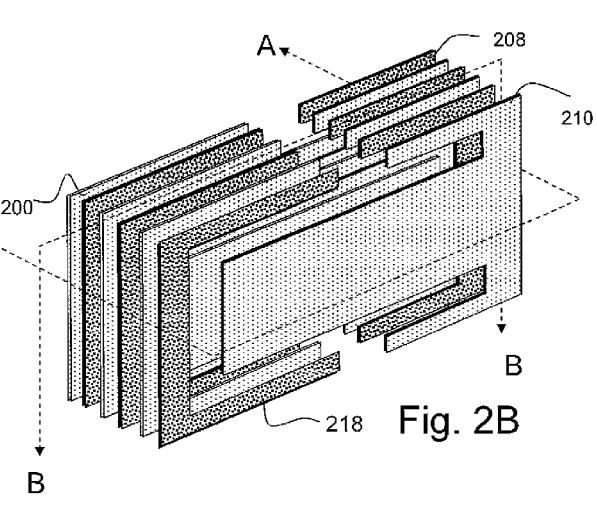

A perspective view of a stack of six sheets of electrodes is illustrated in FIG. 2B, showing the alternating sets of electrodes. First and second sheets of electrodes (each first sheet consisting of a first main electrode 200 and first C-shaped electrode 208, and each second sheet consisting of a second main electrode 210 and second C-shaped electrode 218) are alternately stacked with dielectric layers to form a multi-layered structure such as shown in the cross-sectional view of FIG. 2D. The dielectric material 215 in FIG. 2D may typically be provided between each adjacent sheet of electrodes in an alternating stack. The thickness of the dielectric layers between electrode sheets may be selected to provide a predetermined capacitance value for a primary parallel-plate capacitance, while also accommodating thin-film plated terminations as described later in this application. The thickness of dielectric layers on the top and bottom of the electrode stacks may be slightly greater to form dielectric cover layers that provide additional mechanical protection and structural integrity for the resultant device. Dielectric material 215 and the electrodes may respectively be applied in layers, or sheets, as a device is being formed. However, it should be appreciated that after firing, a finished device may be considered as a block of dielectric material in which electrodes are embedded.

Different materials known to those of ordinary skill in the art may be selected for forming the electrodes and dielectric material of the subject capacitors. For example, electrodes 200, 210, 208 and 218 may be formed of a variety of different conductive materials, such as but not limited to platinum, silver, nickel, copper, a palladium-silver alloy, combinations of these and/or other conductive materials, or other suitable conductive substances. Dielectric material 215 may comprise a ceramic, semiconductive, or insulating material, such as but not limited to barium titanate, calcium titanate, zinc oxide, alumina with low-fire glass, or other suitable ceramic or glass-bonded materials. Alternatively, dielectric material 215 may be an organic compound such as an epoxy (with or without ceramic mixed in, with or without fiberglass), popular as circuit board materials, or other plastics common as dielectrics. In these cases the conductor is usually a copper foil which is chemically etched to provide the patterns. In still further embodiments, dielectric material 215 may comprise a material having a relatively high dielectric constant (K), such as one of NPO (COG), X7R, X5R X7S, Z5U, Y5V and strontium titanate. In one example, dielectric material is used that has a dielectric constant within a range from between about 2000 and about 4000.

Figure 2C:
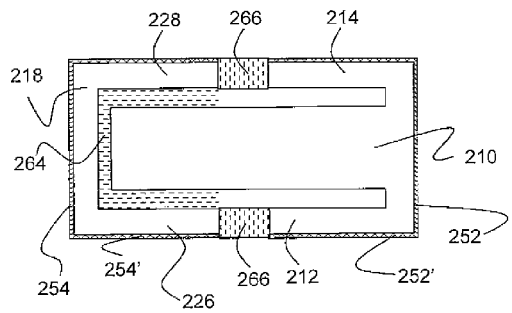
Figure 2D:
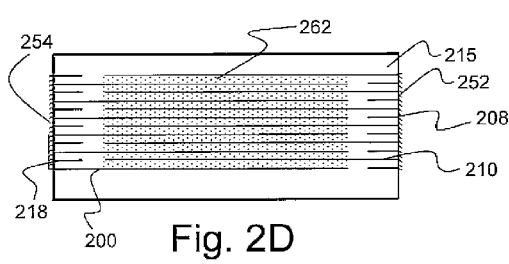

Once a selected configuration of electrodes and dielectric material are stacked together, an unterminated six-sided device such as that shown in FIG. 2F is formed. Exposed edges of first main electrodes 200 and second C-shaped electrodes 218 are aligned in a stacked configuration at one side of the device, while exposed edges of second main electrodes 210 and first C-shaped electrodes 208 are aligned in a stacked configuration at an opposing side of the device. External terminations 252 and 254 are formed as illustrated in FIGS. 2C, 2D and 2G to connect electrode plates of a given polarity together. As shown in such figures, a first external termination 252 comprises a first polarity terminal directly connected to and electrically coupling all first C-shaped electrodes 208 and all second main electrodes 210 together. Similarly, a second external termination 254 comprises a second polarity terminal directly connected to and electrically coupling all first main electrodes 200 and all second C-shaped electrodes 218 together. As further shown, each external termination has a respective portion 252, 254 that extends along an entire dimension of a given surface of the finished capacitor and wraps around to respective adjacent surfaces as denoted by portions 252' and 254'. It should be appreciated that other terminal structures and/or connections to one or more of the electrodes are also within the purview of the presently disclosed technology.

In one particular embodiment of the disclosed technology, terminals 252 and 254 may be formed by depositing a thin-film plating of conductive material to selected exposed electrode portions and ultimately forming "plated terminations." Such plated terminations may be Conned by electroplating (or electrochemical deposition), wherein an unterminated stack of fired dielectric and electrode layers with exposed electrode portions is subjected to a plating solution such as electrolytic nickel or electrolytic tin characterized by an electrical bias. The capacitor itself is then biased to a polarity opposite that of the plating solution, and conductive elements in the plating solution are attracted to selected of the exposed electrode portions of the capacitor. An alternative plating technique with no polar biasing is referred to as electroless plating, and can be employed in conjunction with electroless plating solutions such as nickel or copper ionic solution to form any of one or more termination layers.

In accordance with electrochemical plating and/or electroless plating techniques, a batch process such as barrel plating or the like is employed whereby an unterminated capacitor is preferably fully submerged or immersed in an appropriate plating solution for a particular amount of time. With certain embodiments of the present subject matter, no longer than fifteen minutes is required for enough plating material to deposit at selected exposed electrode portions along an ultra broadband capacitor such that buildup is enough to spread the plating material to create a continuous connection among selected adjacent exposed electrode portions of a given polarity.

One particular methodology for forming plated terminations in accordance with the disclosed technology relates to a combination of the above-referenced plating application techniques. An ultra broadband capacitor may first be submersed in an electroless plating solution, such as copper ionic solution, to deposit an initial layer of copper over selected exposed electrode portions. The plating technique may then be switched to an electrochemical plating system which allows for a faster buildup of copper on the selected portions of such component. Further assurance of complete plating coverage and bonding of the plated materials may be achieved by including resistance-reducing additives in the plating solution(s). A still further mechanism for enhancing the adhesion of metallic deposit that forms the plated terminations is to thereafter heat the component in accordance with such technologies as baking, laser subjection, UV exposure, microwave exposure, arc welding, etc. Such processes may be generally referred to as "annealing" in some embodiments.

In accordance with the different available techniques for plating material to selected exposed electrode portions of an ultra broadband capacitor in accordance with the present technology, different types of materials may be used to create the plated terminations. For instance, metallic conductors such as nickel, copper, tin, etc. may be utilized as well as suitable resistive conductors or semi-conductive materials (such as are provided in accordance with varistor technology), and/or combinations of selected of these different types of materials. One particular example of terminations 252, 254 corresponds to a first thin-film plating of copper (Cu), followed by a second plating of nickel (Ni), and a third plating of tin (Sn), lead (Pb), gold (Au), or alloyed combinations of such materials. In one embodiment, such a three-layered thin-film termination is formed with an approximate thickness of about ten microns.

Plated terminations in accordance with the present subject matter are guided by the position of exposed electrode portions. Such phenomena may be referred to as "self-determining" since the formation of plated terminations is determined by the configuration of exposed metallization at selected peripheral locations on the ultra broadband capacitor. Distances between adjacent exposed conductive portions in a given column may be specifically designed to ensure guided formation of terminations in accordance with the disclosed technology. In some embodiments, such distance between exposed conductive portions in a given column is less than about ten microns and is less than about eight microns in other embodiments (e.g., in a range from between about 2-8 microns). The provision of C-shaped electrodes 208, 218 in addition to main electrodes 200, 210 helps ensure a sufficiently close distance between exposed electrodes in a given stack. As such, C-shaped electrodes 208, 218 respectively serve as both a functional electrode for providing capacitive coupling effects as well as a mechanical "anchor tab" to help increase adherence of plated terminations 252, 254 to the capacitor periphery. As further discussed with reference to FIGS. 8C, additional counter electrodes, shield electrodes or others may be placed between first and second electrode sheets and/or in dielectric cover layers above and/or below the main electrode stack and/or on topmost and/or bottommost surfaces of the device to provide additional exposed conductive portions which may provide nucleation and guide points for the formation of plated terminations in accordance with the above-described process.

Additional aspects of the above-described technology for forming thin-film plated terminations is described in U.S. Pat. No. 7,177,137 to Ritter et al. entitled "Plated Terminations," which is incorporated by reference herein for all purposes and owned by the owner of the present technology. It should be appreciated that additional technologies for forming capacitor terminals may also be within the scope of the present technology. Exemplary alternatives include, but are not limited to, formation of terminations by plating, masking, sputtering, vacuum deposition, printing or other techniques for forming both thick-film or thin-film conductive layers.

Referring still to a first exemplary embodiment of the disclosed ultra broadband capacitor technology, FIGS. 2C, 2D and 2E collectively illustrate how multiple capacitances are formed using the first and second opposing sheets of electrodes described above. In one particular example, four groups of capacitive areas 262, 264, 265 and 266 are formed within a device. These areas are generally represented in FIGS. 2C and 2D. Primary capacitance area 262 arises from overlap of the central portions 206, 216 of first main electrodes 200 and second main electrodes 210. Each set of opposing first and second electrodes contributes to the first primary capacitance 262, as shown in FIG. 2D, and as represented by dotted cross hatching. Secondary capacitance area 264, one layer of which is represented in FIG. 2C with horizontal-dashed cross hatching, arises from coupling between C-shaped electrode 218 of a first polarity and the adjacent portions of main electrode 210, which has an opposite polarity to that of C-shaped electrode 218. A tertiary capacitance 266, as represented in FIG. 2C with vertical-dashed cross hatching, arises from the areas of coupling between side arms 228 and 214 and between side arms 226 and 212. Capacitance 265, as represented in FIG. 2C with X-cross hatching, arises from the specific area of coupling between the end of central portion 216 of main electrode 210 and the end portion of C-shaped electrode 218. In some embodiments of the present technology, it may be desired to represent capacitance 265 as part of secondary capacitance 264, although these areas are depicted separately in FIGS. 2C and 2E.

Referring now to FIG. 2E, the four groups of capacitance areas 262, 264, 265 and 266 described above are depicted in a circuit schematic representation, with capacitive area 262 of FIG. 2D represented schematically as capacitor 262', and capacitive areas 264, 265 and 266 of FIG. 2C represented schematically as capacitors 264', 265' and 266', respectively. Common shading is used to represent the schematic capacitors of FIG. 2E to the corresponding capacitive areas of FIGS. 2C and 2D.

It should be appreciated that the actual values of capacitors 262', 264', 265' and 266' may be selectively designed by choosing such parameters as the number of electrode sheets in a capacitor, the surface area of the overlapping main portions of respective main electrode pairs, the distance separating electrodes, the dielectric constant of dielectric material in the capacitor, and other parameters. In one exemplary ultra broadband capacitor embodiment, primary capacitor 262' generally corresponds to a relatively large capacitance adapted for operation at a generally lower frequency range, such as on the order of between about several kilohertz (kHz) to about 200 megahertz (MHz), while secondary capacitor 264' and tertiary capacitors 265' and 266' generally correspond to relatively smaller value capacitors configured to operate at a relatively higher frequency range, such as on the order of between about 200 megahertz (MHz) to many gigahertz (GHz). In some embodiments, the primary capacitance may be within a range of between about 1-500 nF, between about 10-100 nF, or within any other exemplary range of suitable capacitance values. In some embodiments, the secondary capacitance may be within a range of between about 1-500 pF, 10-100 pF, or within any other exemplary range of suitable capacitance values.

Referring still to FIG. 2E, exemplary parameters selected for an example of the subject ultra broadband capacitor will now be discussed. It should be appreciated that such parameters are presented for example only, and should not unduly limit the scope of the presently disclosed technology. In one particular exemplary embodiment, primary capacitance 262 has a value of about 100,000 picoFarads (pF), and is formed from seventy-six (76) sheets of electrode layers having an overlap area of about 0.19 mm$^2$, a dielectric thickness between electrode sheets of about four microns, and a dielectric material having a dielectric constant of about 3200. Secondary capacitance 264' that arises between the edges of a main electrode and surrounding arms of a C-shaped electrode in the same plane has an exemplary value of about one-hundred-fifteen (115) pF, and is formed by configuring the surface area of electrode edges to be about 0.25 mm and the dielectric thickness (relatively uniform distance between an edge of the main electrode and opposing edge of a surrounding C-shaped electrode) to be about sixty (60) microns. The area of coupling in FIG. 2C represented as capacitance area 265 (corresponding to capacitor 265' in FIG. 2E) may contribute about fifty (50) pF in one exemplary embodiment. Tertiary capacitance 266' arising between the opposing side arms of a main electrode and C-shaped electrode in the same plane has an exemplary value of about ten (10) pF, and is formed by configuring the surface area of each respective opposing electrode edge to be about 0.05 mm$^2$ and the dielectric thickness (distance between opposing arm edges) to be about one-hundred-seventy-five (175) microns.

FIGS. 3A-3C illustrate a first variation of the first embodiment of the present subject matter. In the first variation, the C-shaped electrodes 208, 218 of FIGS. 2A-2D are replaced with L-shaped electrodes 238, 248 and single extension arms 234, 242 are associated with electrodes 236, 246, respectively. Electrodes 236 and 246 may be alternately interleaved (in a manner as depicted in FIG. 3B) with a plurality of dielectric layers (not shown) to form a stacked configuration and resultant structure generally characterized by six surfaces. A portion of each first electrode 236 and each L-shaped electrode 248 extends to and is exposed along an entire dimension of a first surface of the resultant structure and a portion of a second adjacent surface. A portion of each second electrode 246 and each L-shaped electrode 238 extends to and is exposed along an entire dimension of a third surface of the resultant structure (the third surface being the surface opposing the first surface) as well as a portion of the second adjacent surface. The capacitor embodiment of FIGS. 3A-3C, respectively, also forms primary, secondary and tertiary capacitances described above, except that the capacitance 264' is formed from an L-shaped area 284 (as shown in FIG. 3C) instead of the C-shaped area 264 (shown in FIG. 2C). Those of ordinary skill in the art will appreciate that a structure constructed in accordance with this first variation of the first embodiment may be mounted in only a single orientation (e.g., the second surface described above) while the original first embodiment, because of the C-shaped electrodes, may be mounted in plural orientations.

FIGS. 4A-4C illustrate a second embodiment of the present subject matter including an alternative methodology for increasing secondary capacitive regions within the overall multilayer capacitor structure. As illustrated in FIG. 4A, electrode pairs now consist of mirror image designs that intersect with multiple long linear relations. Electrodes 300, 310 are provided in a single plane with triple extension arms corresponding to central portions 300' and 310 respectively, along with side arms 302, 304 and 312, 314. The second layer 324-327 is again a mirror image of the 300-310 pair; pairs of such first and second electrode sheets of FIG. 4A will be stacked together with alternating dielectric layers (not shown) to form overlapping relationships with each other as seen in the perspective view of FIG. 4B. The overlap between opposing polarity electrodes in adjacent sheets of a unit cell will form the primary capacitance described above with respect to FIGS. 2A-2D.

Referring still to FIGS. 4A-4C, each electrode 300, 310, 324, 327 has an end portion exposed along a surface, from which three extension portions reach out. The three extension portions generally correspond to a central portion and two side arms. Electrode 300 will now be described in more particular detail, with the understanding that such description equally applies to electrodes 310, 324 and 327. Central portion 300' and side arms 302 and 304 all extend from an end portion of electrode 300, where the end portion is configured to extend to and be exposed along an entire dimension of a first surface of an unterminated multilayer capacitor. Central portion 300' and side anus 302 and 304 generally extend from the end portion of electrode 300 such that all three extension arms are generally parallel to one another. The central portion 300' is located between the side arms 302, 304 and extends a farther distance from the end portion of electrode 300 than the side arms 302, 304 (e.g., about twice as long as the distance the side arms 302, 304 extend from the end portion of electrode 300).

The capacitor embodiment of FIGS. 4A-4C, respectively, also forms primary, secondary and tertiary capacitances described above with respect to FIGS. 2A-2G, except that the secondary capacitance 264' is formed from the serpentine area 364 (as shown in FIG. 4C) instead of the C-shaped area 264 (shown in FIG. 2C). FIG. 4C is a duplication of the top electrode sheet illustrated in FIG. 4A, but with the secondary capacitance from coupling of the internal electrodes emphasized as area 364. In a given electrode sheet as shown in FIG. 4C, capacitance area 364 is generally formed along a path defined between adjacent edges of first side arm 302 of electrode 300 and central portion 310' of electrode 310, between the far edge of central portion 310' and part of the end portion of electrode 300, between adjacent edges of central portion 310' and central portion 300', between the far edge of central portion 300' and part of the end portion of electrode 310, and between adjacent edges of central portion 300' and side arm 314. Given insight from the present disclosure, those of ordinary skill in the art will appreciate that more complex electrode pairs can additionally increase development of secondary capacitance. Exemplary, non-limiting configurations include interlocking comb structures, and interlocking spirals. All such constructions and others are envisioned to be within the scope of the present disclosure.

In accordance with a third embodiment of the present subject matter, another way of incorporating parallel capacitance in the structure is by incorporating added layers in the stack. In the embodiment of FIGS. 5A and 5B, the same structure introduced in FIGS. 2A-2G is provided with additional electrodes 411, 413 and 411', 413' above and below the stack of electrode sets 401-403 and 405-407. In one embodiment, electrodes 411, 413, 411' and 413' may be generally rectangular in shape. Again, those of ordinary skill in the art will appreciate that the stack of electrodes 401-403 and 405-407 sets may correspond to many more electrodes than illustrated, for example on the order of about one hundred layers or more. The electrodes, 411, 413 along with their counterpart at the other end, 411', 413 provide another stacking area capacitance, as can be seen in the perspective of FIG. 5B. For ease of illustration, the "C" shaped electrodes 403 and 405 have been omitted from the perspective view of FIG. 5B, and rectangular electrodes 411' and 413' are illustrated transparently with an outline only. In particular, rectangular electrode 411' may form a parallel plate capacitance with an overlapping part of the central portion of an immediately adjacent electrode 407. Similarly, rectangular electrode 413 may form a parallel plate capacitance with an overlapping part of the central portion of immediately adjacent electrode 401. In a schematic representation, such additional capacitances formed in part by one or more of plates 411, 413, 411' and 413' would be added in parallel to the primary, secondary and tertiary capacitances depicted in FIG. 2E. It should be appreciated that the resultant device formed with the electrode layers of FIGS. 5A-5C has more versatile mounting capabilities, and can be mounted in multiple orientations on any of a plurality of different device surfaces.

Figure 6A:
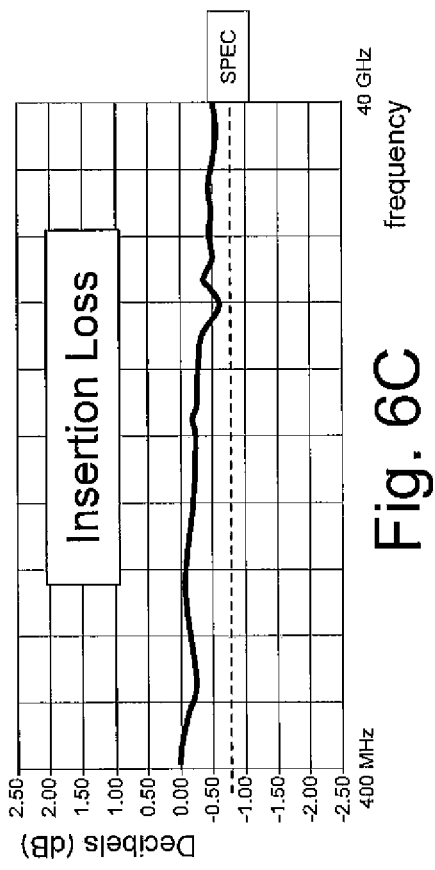
Figure 6B:
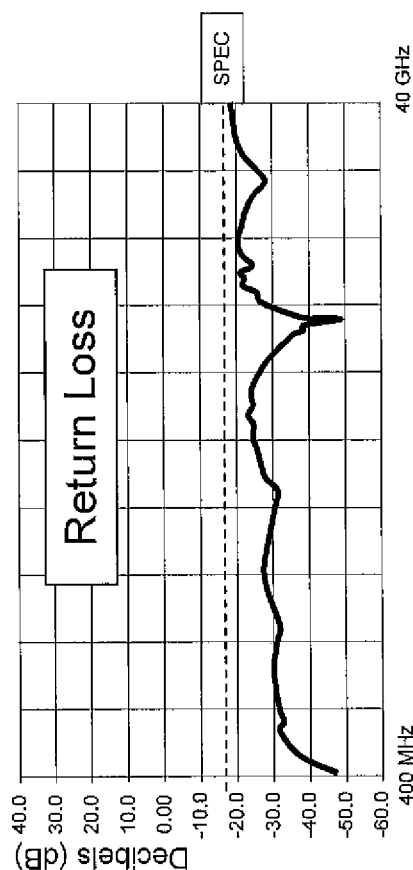
Figure 6C:
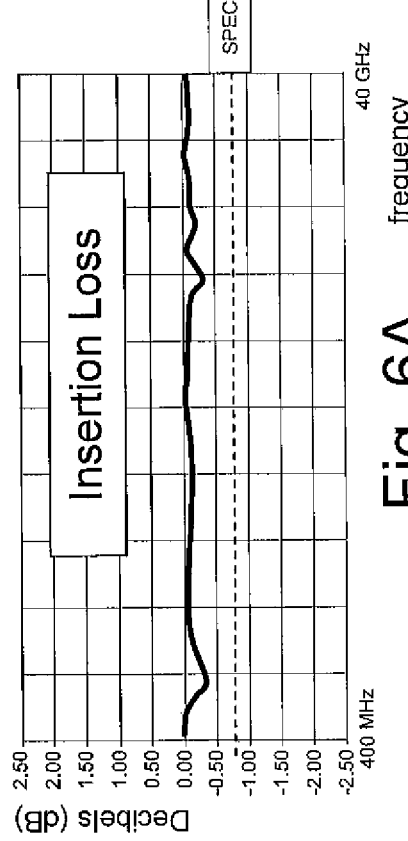
FIGS. 6C-6D illustrate comparative performance characteristics of an exemplary wideband capacitor constructed in accordance with the present technology.
Figure 6D:
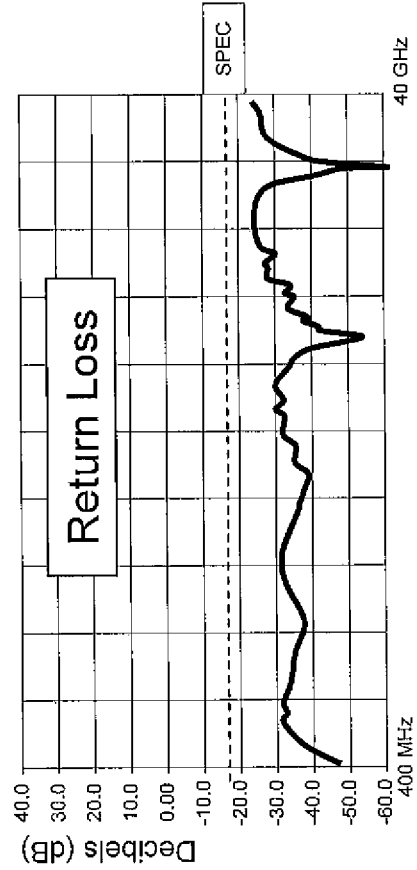

A significant aspect of the present subject matter may be seen by comparison of FIGS. 6A and 6B to FIGS. 6C and 6D. When the Insertion and Return Loss of the previously know structure illustrated in FIGS. 1A-1J is measured, the results may be plotted as illustrated in FIGS. 6A and 6B. This relatively expensive capacitor meets specification of less than −0.75 dB Insertion Loss, and greater than −18 dB of Return Loss over a wide range of operational frequencies (including and exceeding 400 MHz-40 GHz). In accordance with present disclosure, a device has been provided that has characteristics as illustrated in FIGS. 6C and 6D, which, for all practical purposes, provide substantially identical performance characteristics to the previously known device and are provided in a capacitor that is much simpler and less expensive to build.

FIGS. 7A-7C concern a second exemplary variation of the first embodiment of the present subject matter illustrated in FIGS. 2A-2G. In such second variation, each central portion of the first and second main electrodes has an enlarged portion towards the center of each electrode sheet that relatively increases the overlap area of first and second main electrodes and thus increases the capacitance per layer in each unit cell. Such optimized parameters help improve the low frequency performance of the broadband device provided by the primary capacitance. Such modification is especially beneficial for relatively smaller devices, for example parts having a standard case size of 0201, where component sizes of "XXYY" correspond to one having a width dimension of 0.XX inches and a length dimension of 0.YY inches.

Referring more particularly to FIG. 7A, a first electrode sheet includes a first main electrode 700 and first counter electrode 708. First main electrode 700 has arm-like appendages (i.e., extension arms) 702, 704 positioned on either side of a central portion 706. On the same plane, serving as both anchor tab and counter electrode is a first C-shaped electrode 708 having side arms 722, 724 extending from an end portion. In one embodiment, first main electrode 700 can be viewed as having an end portion 701 that extends to and is exposed along an entire dimension of a surface of an unterminated stack of dielectric and electrode layers. The central portion 706 and extension arms 702, 704 of first main electrode 700 all extend from different locations along the end portion 701 in a manner such that central portion 706 and extension arms 702, 704 are all generally parallel to one another. Respective sides of the extension arms 702 and 704 may also extend to and be exposed along respective surfaces adjacent to the surface at which end portion 701 is exposed. First C-shaped electrode 708 also has an end portion that extends to and is exposed along an entire surface of an unterminated stack of dielectric and electrode layers. The side arms 722, 724 extend from such end portion of first C-shaped electrode 708 and have portions that extend to and are exposed along respective surfaces adjacent to the surface at which the end portion of first C-shaped electrode 708 is exposed.

Referring still to FIG. 7A, a second electrode sheet has a similar, mirrored structure to the first electrode sheet and includes a second main electrode 710 and second counter electrode 718 where second main electrode 710 includes extension arms 712, 714 positioned on either side of central portion 716. Central portion 716 and extension arms 712, 714 all generally extend parallel to one another from an end portion 711. On the same plane, serving as both anchor tab and counter electrode is a second C-shaped electrode 718 having side arms 726, 728. As described above relative to first main electrode 700 and first C-shaped electrode 708, the second main electrode 710 and second C-shaped electrode 718 may be viewed as having end portions from which central portions and/or side arm portions extend. Other aspects of positioning and exposure along a device periphery may equally apply, although it should be appreciated that some embodiments may not require the fall amount of surface exposure of the various electrode edges as illustrated and described above.

The enlarged portion of each central portion 706 of each first main electrode 700 and each central portion 716 of each second main electrode 710 may be configured in a variety of particular manners. For example, one embodiment includes central portions 706, 716 having a first maximum width (e.g., W1 in FIG. 7A) and an enlarged portion defined by a second maximum width (e.g., W2 in FIG. 7A) larger than the first maximum width. In another example, the central portion 706, 716 of each first and second main electrode 700, 710 comprises first and second substantially rectangular portions 731, 732, 733, 734 defined by a first maximum width and an enlarged area 735, 736 between the first and second rectangular portions defined by a second maximum width that is larger than the first maximum width. The enlarged areas 735, 736 of the central portions 706, 716 may be particularly configured in one of a variety of shapes, for example, substantially polygonal (e.g., triangular, rectangular, hexagonal, octagonal, etc.) or circular/oval in shape.

A perspective view of a stack of four sheets of electrodes (two first sheets and two second sheets) is illustrated in FIG. 7B, showing the alternating sets of electrodes. First and second sheets of electrodes (each first sheet consisting of a first main electrode 700 and first C-shaped electrode 708, and each second sheet consisting of a second main electrode 710 and second C-shaped electrode 718) are alternately stacked with dielectric layers to form a multi-layered structure. The interleaved arrangement of electrode and dielectric layers may be implemented as described above.

An exemplary capacitor having first and second electrode sheets as shown in FIGS. 7A and 7B was built to have 0201 device dimensions, and included 51 sheets of first and second active nickel electrode layers having an overlap area of about 0.03 mm$^2$, a dielectric thickness between electrode sheets of about four microns and a barium-titanate based dielectric material having a dielectric constant of about 3200. By using first and second main electrodes having an enlarged center area as shown in FIGS. 7A and 7B, a 25-50% increase in active overlap area and resultant primary capacitance was achieved relative to a device without the enlarged electrode areas. The capacitance of an exemplary device is in a range from about 8-12 nF (e.g., about 10 nF in one embodiment). FIG. 7C graphically illustrates the broadband response in terms of both the insertion loss and return loss measured in decibels (dB) for such an exemplary device. More particularly the dotted line plots the insertion loss versus frequency in MegaHertz (MHz) while the dashed line plots the return loss versus frequency.

Figure 8A:
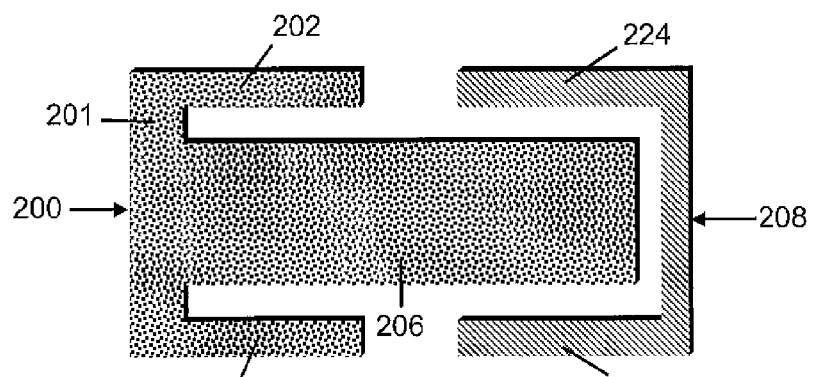
FIG. 8A provides a plan view of an exemplary first electrode sheet including a first main electrode and first counter electrode as also shown in FIGS. 2A and 2B.
Figure 8B:
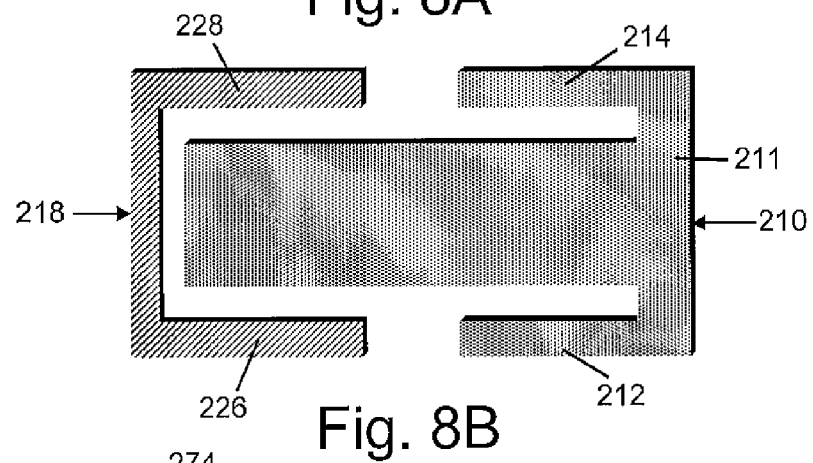
FIG. 8B provides a plan view of an exemplary second electrode sheet including a second main electrode and second counter electrode as also shown in FIGS. 2A and 2B.
Figure 8C:
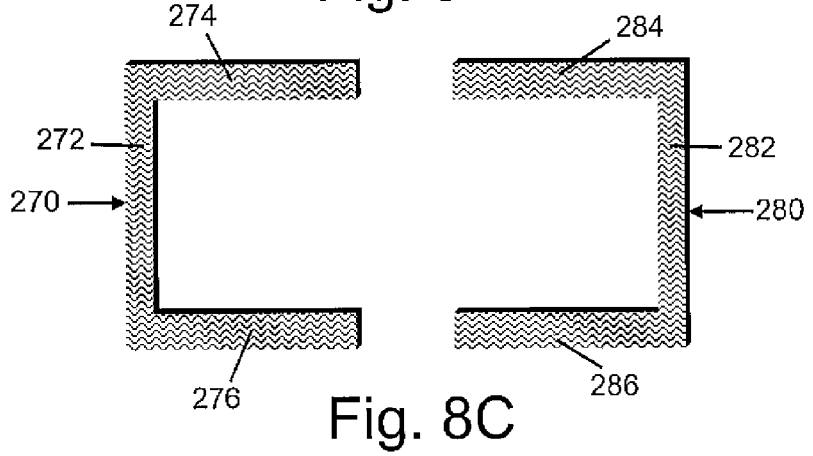
FIG. 8C provides a plan view of an exemplary third electrode sheet including opposing third and fourth counter electrodes for selective use in embodiments of the present technology.
Figure 8D:
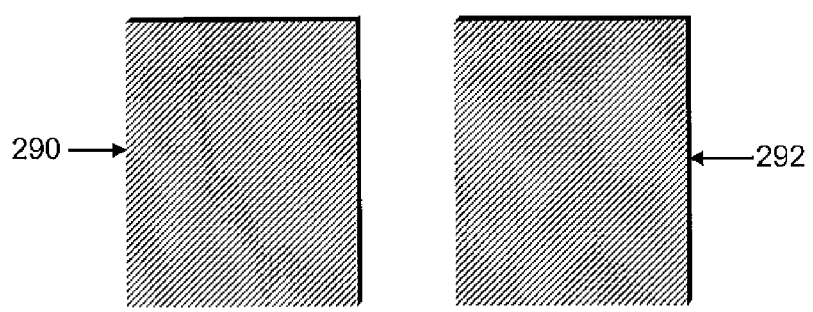
FIG. 8D provides a plan view of an exemplary fourth electrode sheet including opposing first and second shield electrodes for selective use in embodiments of the present technology.
Figure 9A:
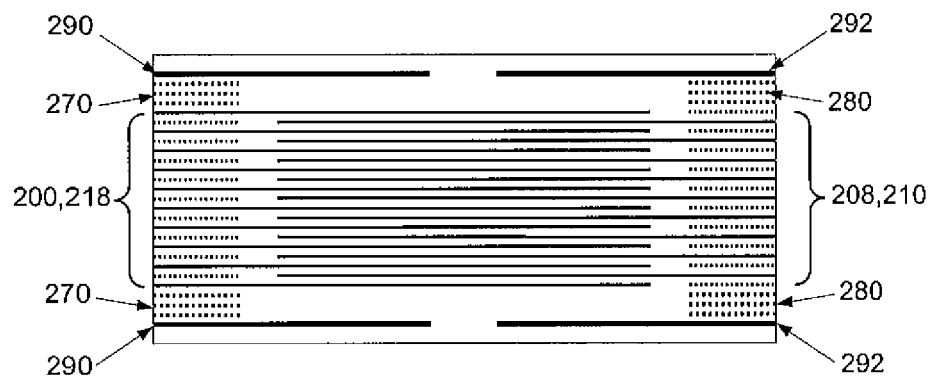
FIG. 9A provides a cross-sectional view of an exemplary broadband capacitor in accordance with aspects of the presently disclosed technology selectively incorporating exemplary first, second, third and fourth electrode sheets of FIGS. 8A-8D, respectively.
Figure 9B:
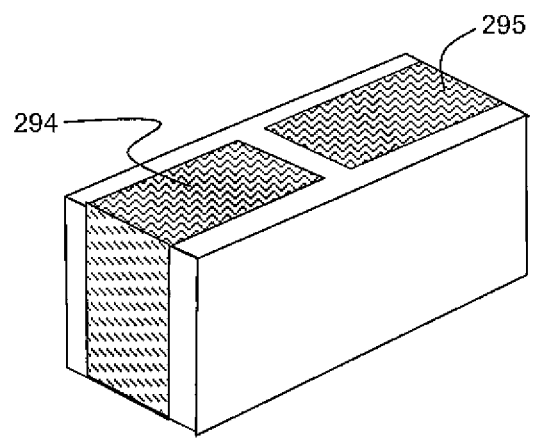
FIG. 9B provides a perspective view of an exemplary broadband capacitor such as shown in FIG. 9A with 3-sided external terminations formed on the device periphery.
Figure 10A:
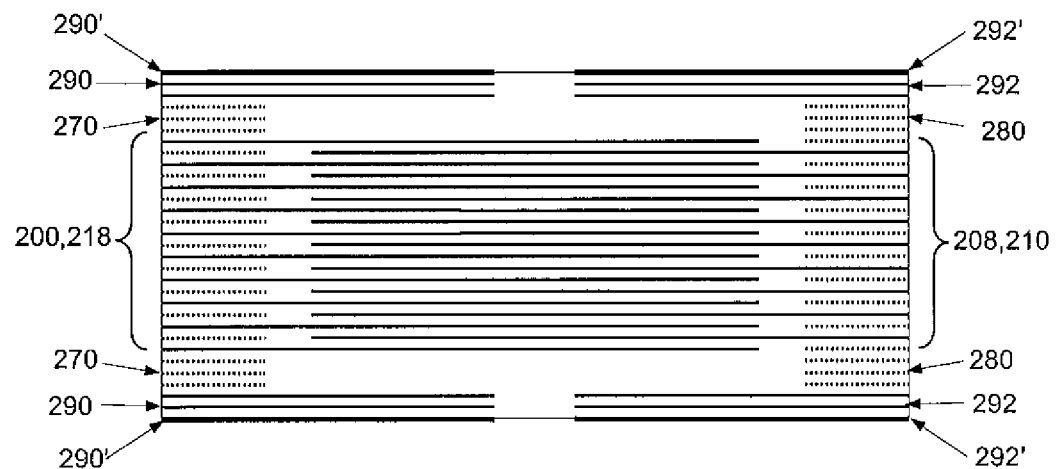
FIG. 10A provides a cross-sectional view of another exemplary broadband capacitor in accordance with aspects of the presently disclosed technology selectively incorporating exemplary first, second, third and fourth electrode sheets of FIGS. 8A-8D, respectively.
Figure 10B:
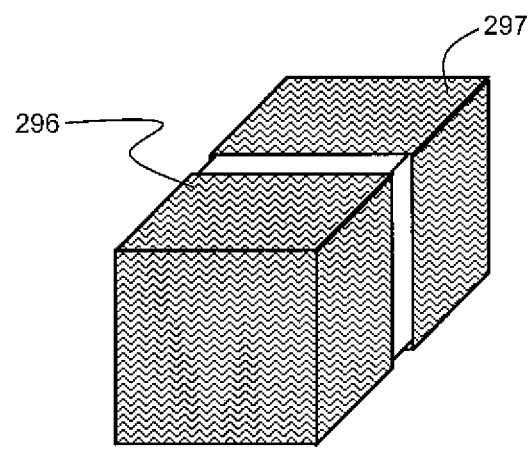
FIG. 10B provides a perspective view of an exemplary broadband capacitor such as shown in FIG. 10A with 5-sided external terminations formed on the device periphery.

FIGS. 8A-10B illustrate additional specific combinations of the above-disclosed features and aspects of present ultra broadband capacitor technology. More particularly, FIGS. 8A-8D show four different electrode sheets that may be variously combined with dielectric material to achieve different multilayer capacitors in accordance with the presently disclosed technology. FIGS. 9A and 9B show one such exemplary combination of electrode sheets, resulting in a multilayer capacitor having respective three-sided external terminations. FIGS. 10A and 10B show another exemplary combination of electrode sheets, resulting in a multilayer capacitor having respective five-sided external terminations.

Referring to FIGS. 8A-8D, FIGS. 8A and 8B show first and second electrode sheets corresponding to those illustrated in FIGS. 2A and 2B. Like reference numerals are used to indicate the same or similar elements. The first electrode sheet of FIG. 8A includes first main electrode 200 and first counter electrode 208, while the second electrode sheet of FIG. 8B includes second main electrode 210 and second counter electrode 218. Each first and second main electrode 200, 210 includes a respective central portion 206, 216 and first and second extension arms 202, 204 and 222, 224. Each first and second counter electrode 208, 218 includes first and second extension arms 222, 224 and 226, 228 that are longitudinally aligned with the extension arms of the opposing first and second main electrodes in each given sheet. Opposing first and second electrode sheets are alternately stacked with dielectric material to form the active layers of a multilayer broadband capacitor.

FIG. 8C shows a third electrode sheet that includes third and fourth counter electrodes 270 and 280 configured for use as dummy/anchor electrodes within a multilayer capacitor. Such third electrodes may be provided within dielectric material anywhere in a multilayer capacitor to provide additional nucleation points and guides for external terminations, especially when such terminations are formed using the previously described techniques for plating (e.g., by electroless and/or electrolytic plating) a thin-film layer of conductive material directly to internal electrode portions exposed along one or more device surfaces. In one example, third electrode sheets including third and fourth counter electrodes 270, 280 may be provided in between selected first and second electrode sheets where additional plating nucleation points are needed. In another example, third electrode sheets as shown in FIG. 8C may be provided on top and/or bottom of a stacked assembly of first and second electrode sheets and interleaved dielectric material to form termination nucleation points for the top and bottom cover layers. In a still further example, third electrode sheets as shown in FIG. 8C may be provided in between main electrodes and shield electrodes (e.g., as illustrated in FIGS. 5A and 8D), or even beyond the shield electrodes towards top and/or bottom device surfaces.

In the particular embodiment shown in FIG. 8C, each counter electrode 270 may be generally C-shaped to include an end portion 272 from which respective extension arms 274 and 276 extend in a substantially parallel relationship to one another. Each counter electrode 280 may also be generally C-shaped to include an end portion 282 from which respective extension arms 284 and 286 extend in a generally parallel relationship to one another. In a given third electrode sheet, counter electrodes 270 and 280 are formed in substantially the same plane. Extension arm 274 of counter electrode 270 is substantially longitudinally aligned with extension arm 284 of counter electrode 280, and extension arm 276 of counter electrode 270 is substantially longitudinally aligned with extension arm 286 of counter electrode 280.

FIG. 8D illustrates a fourth exemplary electrode sheet including an opposing pair of first and second shield electrodes 290 and 292, similar to those already shown in and described with reference to FIGS. 5A and 5B. The shield electrodes may also be selectively provided in exemplary multilayer capacitors, for example, within top or bottom portions of such a device to provide additional capacitance, protection from electromagnetic interference, or other device shielding characteristics. Inclusion of shield electrodes has proven to provide high frequency performance superior to a device made without shield electrodes.

Referring now to FIGS. 9A and 9B, a particular example of a device that selectively employs all four of the electrode sheets shown in FIGS. 8A and 8B is illustrated. A plurality of first and second electrode sheets (respectively including first main and counter electrodes 200, 208 and second main and counter electrodes 210, 218) are alternately interleaved with dielectric material to form the active main electrode layers of a multilayer device. On top and bottom of the alternating stack of first and second electrode sheets, a plurality of third electrode sheets (including counter electrodes 270 and 280) are provided. At least one fourth electrode sheet including first and second shield electrodes 290 and 292 is then provided as a top internal electrode layer and a bottom internal electrode layer. Each main electrode, counter electrode and shield electrode in the arrangement of FIG. 9A extends to and is initially exposed along an end surface of the multilayer device. In some embodiments, such internal electrodes extend to and are exposed along the entire dimension of an end surface as well as portions of two adjacent side surfaces. The distance measured along a device surface between each exposed adjacent electrode sheet may be carefully chosen to facilitate the deposition of plated terminations. In one example, spacing between electrode sheets is on the order of between about 2-8 microns. In this latter instance, applied external terminations 294 and 295 as shown in FIG. 9B provide opposing first and second polarity terminals. The resultant three-sided terminal structure configures the device to be mounted on either of two opposing side surfaces.

Referring now to FIGS. 10A and 10B, another particular example of a device that selectively employs all four of the electrode sheets shown in FIGS. 8A and 8B is illustrated. A plurality of first and second electrode sheets (respectively including first main and counter electrodes 200, 208 and second main and counter electrodes 210, 218) are alternately interleaved with dielectric material to form the active main electrode layers of a multilayer device. On top and bottom of the alternating stack of first and second electrode sheets, a plurality of third electrode sheets (including counter electrodes 270 and 280) are provided. A plurality of fourth electrode sheets including first and second shield electrodes 290 and 292 are then provided throughout the cover layer, for example beyond the third electrode sheets. In addition, at least one fourth electrode (consisting of shield electrodes 290' and 292') is provided on each topmost and bottommost surface of the multilayer stack. In one example, the shield electrodes 290' and 292' may be slightly thicker than the inner electrode layers to provide more robustness on the device exterior.

Referring still to FIGS. 10A and 10B, each main electrode, counter electrode and shield electrode in the arrangement of FIG. 10A extends to and is initially exposed along an end surface of the multilayer device as well as portions of the adjacent side surfaces. In addition, shield electrodes 290' and 292' are exposed along portions of the top and bottom surfaces. Such exposure locations are specifically chosen to facilitate the deposition of thin-film material in accordance with the described methods for forming plated terminations. External terminations 296 and 297 may then be formed as shown in FIG. 10B to provide opposing first and second polarity terminals. Each external termination is thus formed on five sides of a device, resulting in a structure that is orientation insensitive in the sense that it can be mounted on top, bottom or either side of the device.

Although particular numbers of first, second, third and fourth electrode layers are shown in FIGS. 9A and 10A, it should be appreciated that fewer or greater numbers of such electrode sheets may be provided in the same or different relative ordering. For example, third electrode sheets may also be provided between the first and second main electrode sheets. A much larger number of first and second electrode sheets may actually be used (e.g., 50-100 layers or more). In addition, it should be appreciated that although FIGS. 9A and 10A and others show electrode sheet arrangements that are generally symmetrical from top to bottom, combinations of third and fourth electrode sheets, for example, may alternatively be provided on only a single top or bottom side of the main electrode stack.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A multilayer capacitor, comprising:
a plurality of first electrode sheets, each first electrode sheet comprising a first main electrode and a separate first counter electrode provided in substantially the same plane, wherein the first main electrode comprises a central portion and at least one extension arm positioned beside the central portion, and wherein the first counter electrode comprises at least one extension arm substantially longitudinally aligned with the at least one extension arm of the first main electrode;
a plurality of second electrode sheets, each second electrode sheet comprising a second main electrode and a separate second counter electrode provided in substantially the same plane, wherein the second main electrode comprises a central portion and at least one extension arm positioned beside the central portion, and wherein the second counter electrode comprises at least one extension arm longitudinally aligned with the at least one extension arm of the second main electrode;
dielectric material interleaved between adjacently stacked first and second electrode sheets to form a stacked arrangement of unit cells, wherein at least part of the central portion of each first main electrode overlaps with at least part of the central portion of a second main electrode in each unit cell;
a first external termination electrically connected to each first main electrode and each second counter electrode; and
a second external termination electrically connected to each second main electrode and each first counter electrode;
wherein each first main electrode comprises an end portion, a central portion and first and second extension arms, wherein the central portion and first and second extension arms of the first main electrode all extend from different locations along the end portion of the first main electrode in a substantially parallel relationship, with the central portion between the first and second extension arms;
each first counter electrode comprises an end portion, a central portion and first and second extension arms, wherein the central portion and first and second extension arms of the first counter electrode all extend from different locations along the end portion of the first counter electrode in a substantially parallel relationship, with the first extension arm of the first counter electrode being substantially longitudinally aligned with the first extension arm of the first main electrode, with the second extension arm of the first counter electrode being substantially longitudinally aligned with the second extension arm of the first main electrode, and with at least part of the central portion of the first counter electrode being substantially laterally aligned with at least part of the central portion of the first main electrode;
each second main electrode comprises an end portion, a central portion and first and second extension arms, wherein the central portion and first and second extension arms of the second main electrode all extend from different locations along the end portion of the second main electrode in a substantially parallel relationship, with the central portion between the first and second extension arms; and
each second counter electrode comprises an end portion, a central portion and first and second extension arms, wherein the central portion and first and second extension arms of the second counter electrode all extend from different locations along the end portion of the second counter electrode in a substantially parallel relationship, with the first extension arm of the second counter electrode being substantially longitudinally aligned with the first extension arm of the second main electrode, with the second extension arm of the second counter electrode being substantially longitudinally aligned with the second extension arm of the second main electrode, and with at least part of the central portion of the second counter electrode being substantially laterally aligned with at least part of the central portion of the second main electrode.

2. The multilayer capacitor of claim 1, wherein:
each first main electrode and each second counter electrode extends to a first end surface and at least one adjacent side surface of the multilayer capacitor and is directly connected to the first external termination at such extended surface locations; and
each second main electrode and each first counter electrode extends to a second end surface and said at least one adjacent side surface of the multilayer capacitor and is directly connected to the second external termination at such extended surface locations.

3. The multilayer capacitor of claim 1, wherein:
each first and second main electrode has an end portion from which the central portion of each main electrode and the at least one extension arm of each main electrode extend in a substantially parallel fashion; and
each first and second counter electrode has an end portion from which the at least one extension arm of each counter electrode extends.

4. The multilayer capacitor of claim 1, wherein each first and second counter electrode further comprises a central portion positioned beside the at least one extension arm, at least part of the central portion of the first counter electrode being substantially laterally aligned with at least part of the central portion of the first main electrode, and at least part of the central portion of the second counter electrode being substantially laterally aligned with at least part of the central portion of the second main electrode.

5. The multilayer capacitor of claim 1, wherein:
each first main electrode and each second counter electrode extends to a first end surface and portions of two adjacent side surfaces of the multilayer capacitor and is directly connected to the first external termination at such extended surface locations; and
each second main electrode and each first counter electrode extends to a second end surface and portions of the two adjacent side surfaces of the multilayer capacitor and is directly connected to the second external termination at such extended surface locations.

6. The multilayer capacitor of claim 1, wherein the central portion of each first and second main electrode has an enlarged area towards the center of the electrode sheet.

7. The multilayer capacitor of claim 1, wherein the central portion of each first and second main electrode comprises at least one portion defined by a first maximum width and an enlarged portion defined by a second maximum width larger than the first maximum width.

8. The multilayer capacitor of claim 1, wherein the central portion of each first and second main electrode comprises first and second substantially rectangular portions defined by a first maximum width and an enlarged area between the first and second rectangular portions defined by a second maximum width that is larger than the first maximum width.

9. The multilayer capacitor of claim 8, wherein the enlarged area of the central portion of each first and second main electrode is substantially polygonal or circular in shape.

10. The multilayer capacitor of claim 1, wherein the dielectric material comprises barium titanate.

11. The multilayer capacitor of claim 1, wherein selected first and second main electrodes and first and second counter electrodes comprise nickel.

12. The multilayer capacitor of claim 1, wherein the distance between each first and second adjacent electrode sheet is in a range from between about 2 microns and 8 microns.

13. The multilayer capacitor of claim 1, wherein each said first and second external termination respectively comprises a thin-film plating of conductive material.

14. The multilayer capacitor of claim 1, wherein each said first and second external termination respectively comprises multiple layers of thin-film plating, wherein selected layers of the multiple layers of thin-film plating comprise one or more of copper, nickel, tin and gold.

15. The multilayer capacitor of claim 1, further comprising:
a plurality of third electrode sheets respectively comprising third and fourth opposing counter electrodes provided in substantially the same plane; and
additional dielectric material interleaved with selected sheets of the plurality of third electrode sheets to form first and second cover layers, a first cover layer provided on top of the alternately stacked first and second electrode sheets and interleaved dielectric material, and a second cover layer provided on the bottom of the alternately stacked first and second electrode sheets and interleaved dielectric material.

16. The multilayer capacitor of claim 1, further comprising at least one third electrode sheet comprising first and second substantially rectangular shield electrodes provided in substantially the same plane.

17. The multilayer capacitor of claim 16, wherein at least one third electrode sheet is provided on top of the alternately stacked first and second electrode sheets and interleaved dielectric material and wherein at least one third electrode sheet is provided on the bottom of the alternately stacked first and second electrode sheets and interleaved dielectric material.

18. The multilayer capacitor of claim 1, further comprising:
a plurality of third electrode sheets respectively comprising third and fourth opposing counter electrodes provided in substantially the same plane;
a plurality of fourth electrode sheets comprising first and second opposing shield electrodes provided in substantially the same plane; and
additional dielectric material interleaved with selected sheets of the plurality of third and fourth electrode sheets to form first and second cover layers, a first cover layer provided on top of the alternately stacked first and second electrode sheets and interleaved dielectric material, and a second cover layer provided on the bottom of the alternately stacked first and second electrode sheets and interleaved dielectric material.

19. The multilayer capacitor of claim 18, wherein at least one fourth electrode sheet is provided on the top of the multilayer capacitor and at least one fourth electrode sheet is provided on the bottom of the multilayer capacitor, such that the first external termination substantially covers a first end surface of the multilayer capacitor and wraps around to a portion of each adjacent side surface and the second external termination substantially covers a second end surface of the multilayer capacitor and wraps around to a portion of each said adjacent side surface.

20. A multilayer capacitor, comprising:

a plurality of first electrode sheets, each first electrode sheet comprising a first main electrode and a separate first counter electrode provided in substantially the same plane, wherein each first main electrode comprises an end portion, a central portion and first and second extension arms, wherein the central portion and first and second extension arms of the first main electrode all extend from different locations along the end portion of the first main electrode in a substantially parallel relationship, with the central portion between the first and second extension arms, and wherein each first counter electrode comprises an end portion and first and second extension arms extending from the end portion, with the first extension arm of the first counter electrode being substantially longitudinally aligned with the first extension arm of the first main electrode and the second extension arm of the first counter electrode being substantially longitudinally aligned with the second extension arm of the first main electrode;

a plurality of second electrode sheets, each second electrode sheet comprising a second main electrode and a separate second counter electrode provided in substantially the same plane, wherein each second main electrode comprises an end portion, a central portion and first and second extension arms, wherein the central portion and first and second extension arms of the second main electrode all extend from different locations along the end portion of the second main electrode in a substantially parallel relationship, with the central portion between the first and second extension arms, and wherein each second counter electrode comprises an end portion and first and second extension arms extending from the end portion, with the first extension arm of the second counter electrode being substantially longitudinally aligned with the first extension arm of the second main electrode and the second extension arm of the second counter electrode being substantially longitudinally aligned with the second extension arm of the second main electrode;

dielectric material interleaved between adjacently stacked first and second electrode sheets to form a stacked arrangement of unit cells, wherein at least part of the central portion of each first main electrode overlaps with at least part of the central portion of a second main electrode in each unit cell;

a plurality of third electrode sheets respectively comprising third and fourth opposing counter electrodes provided in substantially the same plane;

a plurality of fourth electrode sheets comprising first and second opposing shield electrodes provided in substantially the same plane;

additional dielectric material interleaved with selected sheets of the plurality of third and fourth electrode sheets to form first and second cover layers, a first cover layer provided on top of the alternately stacked first and second electrode sheets and interleaved dielectric material, and a second cover layer provided on the bottom of the alternately stacked first and second electrode sheets and interleaved dielectric material;

a first external termination electrically connected to each first main electrode, each second counter electrode, each third counter electrode and each first shield electrode; and a second external termination electrically connected to each second main electrode, each first counter electrode, each fourth counter electrode and each second shield electrode;

wherein each first main electrode comprises an end portion, a central portion and first and second extension arms, wherein the central portion and first and second extension arms of the first main electrode all extend from different locations along the end portion of the first main electrode in a substantially parallel relationship, with the central portion between the first and second extension arms;

each first counter electrode comprises an end portion, a central portion and first and second extension arms, wherein the central portion and first and second extension arms of the first counter electrode all extend from different locations along the end portion of the first counter electrode in a substantially parallel relationship, with the first extension arm of the first counter electrode being substantially longitudinally aligned with the first extension arm of the first main electrode, with the second extension arm of the first counter electrode being substantially longitudinally aligned with the second extension arm of the first main electrode, and with at least part of the central portion of the first counter electrode being substantially laterally aligned with at least part of the central portion of the first main electrode;

each second main electrode comprises an end portion, a central portion and first and second extension arms, wherein the central portion and first and second extension arms of the second main electrode all extend from different locations along the end portion of the second main electrode in a substantially parallel relationship, with the central portion between the first and second extension arms; and each second counter electrode comprises an end portion, a central portion and first and second extension arms, wherein the central portion and first and second extension arms of the second counter electrode all extend from different locations along the end portion of the second counter electrode in a substantially parallel relationship, with the first extension arm of the second counter electrode being substantially longitudinally aligned with the first extension arm of the second main electrode, with the second extension arm of the second counter electrode being substantially longitudinally aligned with the second extension arm of the second main electrode, and with at least part of the central portion of the second counter electrode being substantially laterally aligned with at least part of the central portion of the second main electrode.

21. The multilayer capacitor of claim 20, wherein:

each first main electrode, each second counter electrode, each third counter electrode and each first shield electrode extends to a first end surface and portions of two adjacent side surfaces of the multilayer capacitor and is directly connected to the first external termination at such extended surface locations; and each second main electrode, each first counter electrode, each fourth counter electrode and each second shield electrode extends to a second end surface and portions of the two adjacent side surfaces of the multilayer capacitor and is directly connected to the second external termination at such extended surface locations.

22. The multilayer capacitor of claim 20, wherein the central portion of each first and second main electrode has an enlarged area towards the center of the electrode sheet.

23. The multilayer capacitor of claim 20, wherein the central portion of each first and second main electrode comprises at least one portion defined by a first maximum width and an enlarged portion defined by a second maximum width larger than the first maximum width.

24. The multilayer capacitor of claim 20, wherein the dielectric material comprises barium titanate.

25. The multilayer capacitor of claim 20, wherein selected electrodes of the first and second main electrodes, first and second counter electrodes, third and fourth counter electrodes and first and second shield electrodes comprise nickel.

26. The multilayer capacitor of claim 20, wherein the distance between each adjacent electrode sheet is in a range from between about 2 microns and 8 microns.

27. The multilayer capacitor of claim 20, wherein each said first and second external termination respectively comprises a thin-film plating of conductive material.

28. The multilayer capacitor of claim 20, wherein each said first and second external termination respectively comprises multiple layers of thin-film plating, wherein selected layers of the multiple layers of thin-film plating comprise one or more of copper, nickel, tin and gold.

29. The multilayer capacitor of claim 20, wherein:
at least one top fourth electrode sheet is provided on top of the alternately stacked first and second electrode sheets and interleaved dielectric material; and
at least one bottom fourth electrode sheet is provided on the bottom of the alternately stacked first and second electrode sheets and interleaved dielectric material.

30. The multilayer capacitor of claim 29, wherein:
a plurality of third electrode sheets and interleaved dielectric material are provided between the at least one top fourth electrode sheet and the alternately stacked first and second electrode sheets; and
a plurality of third electrode sheets and interleaved dielectric material are provided between the at least one bottom fourth electrode sheet and the alternately stacked first and second electrode sheets.

31. The multilayer capacitor of claim 29, wherein at least one fourth electrode sheet is provided on the top of the multilayer capacitor and at least one fourth electrode sheet is provided on the bottom of the multilayer capacitor, such that the first external termination substantially covers a first end surface of the multilayer capacitor and wraps around to a portion of each adjacent side surface and the second external termination substantially covers a second end surface of the multilayer capacitor and wraps around to a portion of each said adjacent side surface.

32. The multilayer capacitor of claim 20, wherein the multilayer capacitor has a width of about 0.01 inches and a length of about 0.02 inches and a capacitance of between about 8 nF and 12 nF.

* * * * *